United States Patent
Aharoni et al.

(10) Patent No.: US 7,292,969 B1
(45) Date of Patent: Nov. 6, 2007

(54) METHOD AND SYSTEM FOR SIMULATING PERFORMANCE ON ONE OR MORE DATA STORAGE SYSTEMS

(75) Inventors: Dan Aharoni, Brookline, MA (US); David Meiri, Cambridge, MA (US); Dimitar Petkov Gueorguiev, Framingham, MA (US); Kenneth R. Goguen, Berlin, MA (US); Xiaoyan Wei, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 394 days.

(21) Appl. No.: 10/917,616

(22) Filed: Aug. 13, 2004

Related U.S. Application Data

(63) Continuation-in-part of application No. 10/786,965, filed on Feb. 25, 2004, which is a continuation-in-part of application No. 10/259,011, filed on Sep. 27, 2002.

(51) Int. Cl.
*G06F 13/10* (2006.01)
(52) U.S. Cl. .............................. 703/21; 703/6; 703/22; 711/100; 711/112; 711/118; 711/170; 707/101; 707/204
(58) Field of Classification Search ................ 707/101, 707/204; 703/13, 21, 22–24; 711/100, 112, 711/170, 118
See application file for complete search history.

(56) References Cited

U.S. PATENT DOCUMENTS

| | | | | |
|---|---|---|---|---|
| 5,325,505 A | * | 6/1994 | Hoffecker et al. | .......... 707/101 |
| 5,668,995 A | * | 9/1997 | Bhat | ........................... 718/104 |
| 5,745,737 A | * | 4/1998 | Kayes et al. | ................... 703/13 |
| 5,835,940 A | * | 11/1998 | Yorimitsu et al. | .......... 711/112 |
| 6,209,033 B1 | * | 3/2001 | Datta et al. | ................... 709/224 |
| 6,397,267 B1 | * | 5/2002 | Chong, Jr. | ..................... 710/1 |
| 6,606,585 B1 | * | 8/2003 | Borowsky et al. | ............. 703/2 |
| 6,804,714 B1 | * | 10/2004 | Tummalapalli | ............. 709/224 |
| 6,886,020 B1 | * | 4/2005 | Zahavi et al. | ................ 707/204 |
| 7,050,956 B2 | * | 5/2006 | Uysal et al. | .................... 703/6 |
| 2002/0161566 A1 | * | 10/2002 | Uysal et al. | ................... 703/21 |
| 2005/0071596 A1 | * | 3/2005 | Aschoff et al. | ............. 711/170 |
| 2006/0025985 A1 | * | 2/2006 | Vinberg et al. | ............... 703/22 |
| 2006/0235664 A1 | * | 10/2006 | Vinberg et al. | ................. 703/6 |

OTHER PUBLICATIONS

"The HP AutoRAID Hierarchical Storage System", Wilkes et al, ACM Transactions on Computing Systems, vol. 14, No. 1, Feb. 1996.*
"Minerva: An Automated Resource Provisioning Tool for Large Scale Storage Systems", Alvarez et al, ACM Transactions on Copmputer Systems, vol. 19, No. 4, Nov. 2001.*
A Cost Effective, High Bandwidth Storage Architecture, Gibson et al, ASPLOS VII Oct. 1998, ACM 1998.*
"Server Capacity Planning for Web Traffic Workload", Kant et al, IEEE Transactions of Knowledge and Data Engineering, vol. 11, No. 5, Sep. 1999.*

* cited by examiner

*Primary Examiner*—Fred Ferris
(74) *Attorney, Agent, or Firm*—K. Gupta; R. K. Perkins

(57) ABSTRACT

This invention is a system and method for determining configuration or simulating performance of one or more data storage systems. This invention may be used in many useful ways including for configuring or modeling a data storage environment, problem isolation, and general design.

17 Claims, 28 Drawing Sheets

Configuration

Complete | Active — 226

- Box version: 6330
- # FE boards: 4
- FE port type: FIBRE
- # FE CPUs: 8
- # FE ports: 16
- # memory boards: 2
- # memory areas in board: 4
- # busses: 4
- Box type: ● 5x  ○ 4.8

- # BE boards: 4
- BE port type: SCSI2
- # BE CPUs: 8
- # BE ports: 16
- # LRU locks: 4
- disk type: Cheel73
- disk size: 73
- # disks: 144
- # LV: 576

[OK] [Cancel]

Configuration — 220

Complete | Active — 226

Box version: 6830 Coyote
FE boards: 4
FE port type: FIBRE
FE CPUs: 6
FE ports: 16
memory boards: 2
memory areas in board: 1
busses: 2

BE boards: 4
BE port type: SCS1
BE CPUs: 8
BE ports: 16
LRU locks: 1
disk type: Cheel73
disk size: 73
disks: 144
LV: 514

Box type: ○ 5x  ● 4.8

OK | Cancel

METHOD AND SYSTEM FOR SIMULATING PERFORMANCE ON ONE OR MORE DATA STORAGE SYSTEMS

This application is a continuation-in-part of U.S. patent application Ser. No. 10/786,965 filed Feb. 25, 2004, which is a continuation-in-part of U.S. patent application Ser. No. 10/259,011 filed Sep. 27, 2002, each assigned to the same assignee as this invention. This application is a related to co-pending U.S. patent application Ser. No. 10/917,753 filed by Dan Aharoni et al., filed on even date, and is assigned to the same assignee as this invention.

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to managing and analyzing data in a data storage environment, and more particularly to a system and method for simulating performance in such an environment.

BACKGROUND OF THE INVENTION

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g. disk drives. The one or more processors perform their respective operations using the storage system. Mass storage systems particular those of the disk array type have centralized data as a hub of operations all driving down costs. But performance demands placed on such mass storage have increased and continue to do so.

Design objective for mass storage systems include cost, performance, and availability. Objectives typically include are a low cost per megabyte, a high I/O performance, and high data availability. Availability is measured by the ability to access data. Often such data availability is provided by use of redundancy such as well-known mirroring techniques.

One problem encountered in the implementation of disk array data storage systems concerns optimizing the storage capacity while maintaining the desired availability and reliability of the data through redundancy. It is important to allocate as closely as possible the right amount of storage capacity with going over or under significantly because of cost and necessity but this is a complex task. It has required great deal of skill and knowledge about computers, software applications such as databases, and the very specialized field of data storage. Such requisite abilities have long been expensive and difficult to access. There remains and probably will be an increasing demand for and corresponding scarcity of such skilled people.

Determining the size and number of disk array or other data storage system needed by a customer requires information about both space, traffic and a desired quality of service. It is not sufficient to size a solution simply based on the perceived quantity of capacity desired, such as the number of terabytes believed to be adequate.

In addition to general capacity planning problems with data storage systems other complexities may arise. One such complexity arise when there is an interest in merging existing data storage systems with newer or fewer data storage systems. Such consolidation helps a customer reduce operating costs by decreasing the number of storage systems, and migrating the data to fewer and/or newer, larger capacity, more efficient storage systems. Consolidation may be of interest for some of the following reasons: saving footprint space; reducing the cost of utilities; simplifying management and reducing management costs; reducing hardware inventory costs; and upgrading to new technology. On the other hand there is cost associated with such a change and there is need for a simple tool to allow for the analysis of such a change and to determine an optimum solution, and in particular with regard to performance requirements and desired characteristics.

There is a long-felt need for a computer-based tool that would allow a straight-forward non-complex way to allocate proper storage capacity while balancing cost, growth plans, workload, and performance requirements and further if such a tool would be useful for analyzing consolidation or merging operations. This would be advancement in the computer arts with particular relevance in the field of data storage.

SUMMARY OF THE INVENTION

To overcome the problems described above and to provide the advantages also described above, the present invention is a system and method for simulating performance in a data storage environment and which is useful in an asynchronous remote data replication environment. Such simulations may be used to isolate problem areas and for modeling and capacity planning and/or for performance simulation.

In one embodiment the method includes the steps of receiving configuration data In an embodiment of a system a computer with display and memory are configured with computer-executable program logic capable of performing steps similar or identical to those described above with reference to the embodiment of the method.

In another embodiment, a program product includes a computer-readable medium having code included on the medium configured to carry out computer-executed steps that are similar or identical to those described above with reference to the embodiment of the method.

BRIEF DESCRIPTION OF THE DRAWINGS

The above and further advantages of the present invention may be better under stood by referring to the following description taken into conjunction with the accompanying drawings in which:

FIG. 9 is another exemplary representation of a user interface screen for allowing use of this invention;

FIG. 10 is another exemplary representation of a user interface screen for allowing use of this invention;

DETAILED DESCRIPTION OF THE PREFERRED EMBODIMENT

The methods and apparatus of the present invention are intended for use with data storage systems, such as the Symmetrix Integrated Cache Disk Array system available from EMC Corporation of Hopkinton, Mass. Specifically, this invention is directed to a method and system for simulating performance of one or more data storage systems and which may be useful for applications such storage capacity planning, performance analysis, and problem and fault isolation in a storage environment design.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

The program code (software-based logic) for carrying out the method is embodied as part of the system described below beginning with reference to FIG. 1. One aspect of the invention is embodied as a method that is described below with reference to FIGS. 3-6. User Interface Screens for using the invention are shown in FIGS. 7-14.

Figure 1:
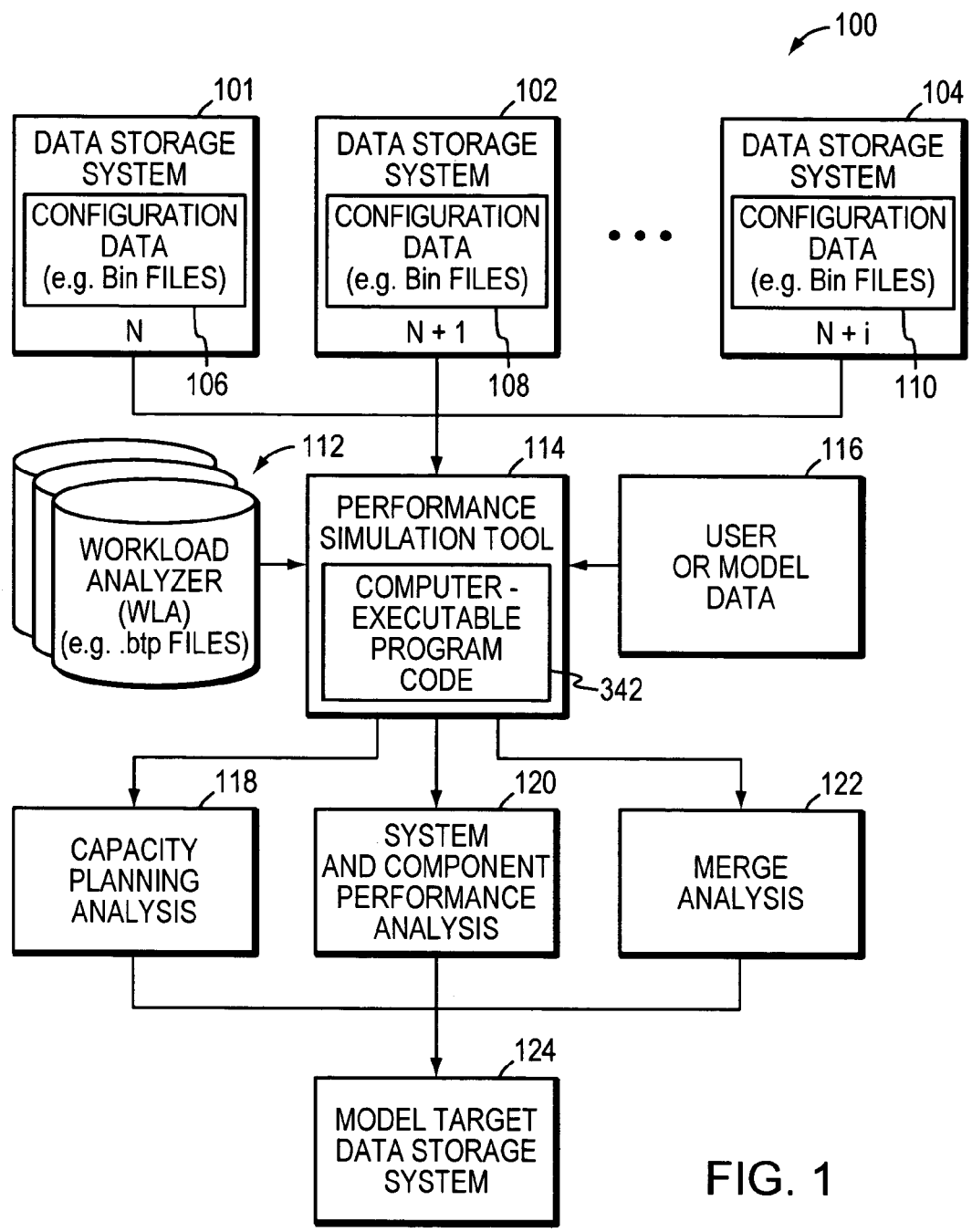
FIG. 1 is a block diagram of a data storage environment including a performance simulation system configured for carrying out method steps of this invention.

Referring now to FIG. 1, reference is now made to a network or local system 100 for which the invention is particularly useful and typically includes a plurality of data storage systems, such as data storage system 100, 102, and 104. The data storage systems are useful if the simulation system tool 114 including computer-executable program code 342 is to use configuration data 106, 108, and 110 of the respective data storage systems in conjunction with workload characteristics form the preferred workload analyzer 112 files (.btp format available as part of EMC's ECC software program; EMC Corporation is based in Hopkinton, Mass.). However optionally, the simulation tool 114 may use user or model data 116 if there are not specific data storage systems (generally n–n+i) to be merged into fewer systems than n+1, e.g., target or model data storage system 124. The target system 124 may also be derived from the user of model data operated on by the data storage simulation tool using the workload files 112, to yield a capacity planning analysis 118, a system and component performance analysis. The merge analysis 122 specifically envisions the need to merge the n+1 storage systems into a target system.

The simulation system or tool preferably uses software 342 for carrying out the method steps described in method steps shown in FIGS. 2-6 and may work on a general purpose digital computer turning such a computer into a special purpose computer comprising an apparatus for carrying out the processes of this invention. The software may be used with any type of data storage system but has been used with a preferred EMC Symmetrix system and may also be used with an EMC Clarion data storage system as well as those of other manufacturers. For exemplary purposes an EMC data storage system is described in the method steps and in conjunction with the user interface screens shown in FIGS. 7-14.

As has been stated, in a preferred embodiment the data storage system to be configured is a Symmetrix Integrated Cache Disk Arrays available from EMC Corporation of Hopkinton, Mass. However, it will be apparent to those with skill in the art that there is no limit to the use of this invention for any system including data storage. Nevertheless, regarding the preferred embodiment, such a data storage system and its implementation is fully described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

Generally a Symmetrix data storage system includes a system memory and sets or pluralities and of multiple data storage devices or data stores. The system memory can comprise a buffer or cache memory; the storage devices in the pluralities and can comprise disk storage devices, optical storage devices and the like. However, in a preferred embodiment the storage devices are disk storage devices. The sets represent an array of storage devices in any of a variety of known configurations.

In such a data storage system, a computer or host adapter provides communications between a host system and the system memory and disk adapters and provides pathways between the system memory and the storage device pluralities. Regarding terminology related to the preferred Symmetrix system, from the host adapter toward the computer or host is sometimes referred to as the front end and from the disk adapters toward the disks is sometimes referred to as the back end. A bus interconnects the system memory, the host adapters and the disk adapters. Although not shown such a bus could be used with switches to provide discrete access to components of the system.

Each system memory is used by various elements within the respective systems to transfer information and interact between the respective host adapters and disk adapters. A service processor may also be used in communication with system memory particularly for maintenance, service needs, and collection of performance data. The service processor is typically a well-known laptop computer, i.e. a general-purpose digital computer, but which may be outfitted with the software-driven simulation system 114 of this invention to comprise a special purpose digital computer for carrying out the processes of this invention.

The simulation system or tool 114 may be used to determine the feasibility of consolidating a number of storage systems to fewer or newer data storage system units, this is sometimes referred to as a "merge" operation. The tool is useful for examining and calculating the utilization of components within the system to be consolidated or merged, such a system may be referred to as a source for a consolidating or merging operation. The tool may also be used to evaluate the performance of a number of different workloads on one or more data storage systems, including a system for which others are merged into, which may be referred to as a target configuration or system. When the tool is used for planning purposes the optimum system derived from the analysis may also be the target system even though no merge operation may be planned, and in such a case user desired performance data may be used to arrive at such a target.

The tool 114 helps to define consolidation mapping and evaluates whether this mapping is favorable for a new upgrade data storage system in terms of performance. The tool may be further used to examine the utilization of components within the new target data storage system and generates a near optimal file (e.g. binary file) that can be used for such a configuration.

All the utilization and calculations are based on modeling the internal operations and processes inside the target data storage system. The accuracy of the calculations is based on the accuracy of the input workload, which is discussed in more detail below. If the workload changes, this evaluation may change significantly. The tool 114 analyzes the utilization of components, as well as the entire system, and may be used for considering workloads from data storage systems being used with Open Systems host computers and Mainframe host computer systems using proprietary schemes.

Figure 14:
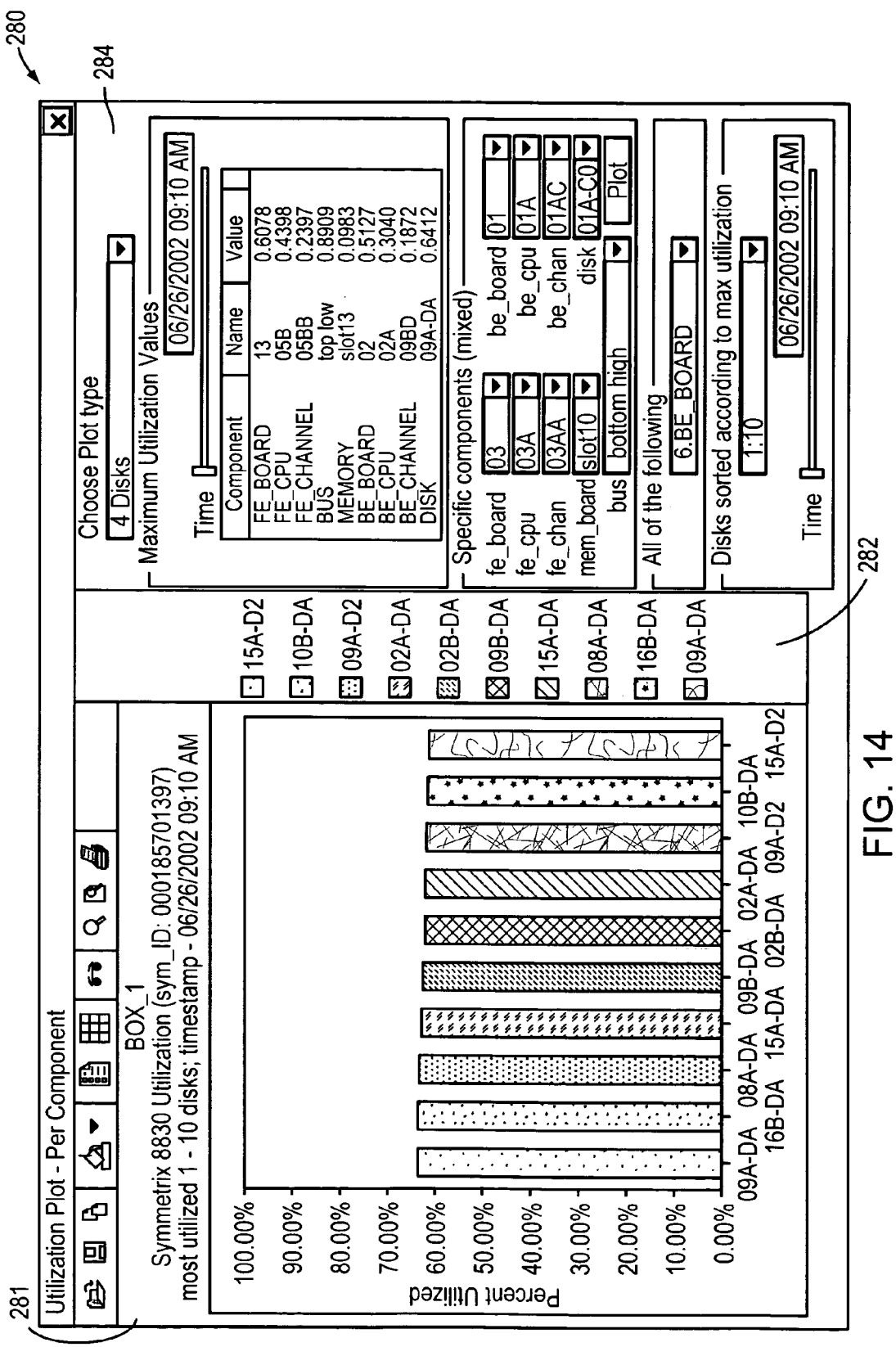
FIG. 14 is another exemplary representation of a user interface screen for using this invention.
Figure 15:
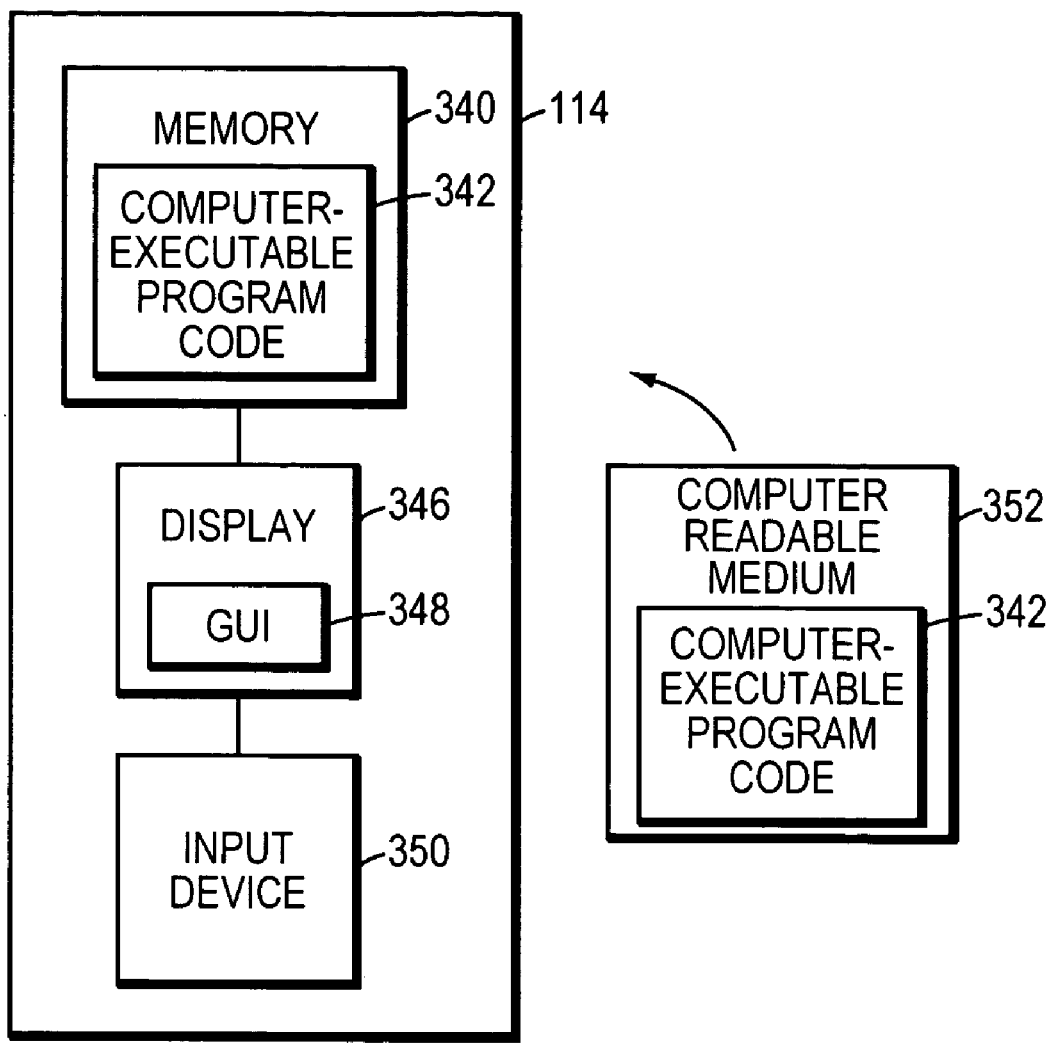
FIG. 15 shows the performance simulation tool of FIG. 1 including the computer-executable program code of the preferred embodiment and including a computer-readable medium encoded with the computer-executable program code for enabling the method of the present invention.

FIG. 15 shows a tool 114 as generally including a general purposed digital computer including memory 340 (e.g., conventional electronic memory) in which is stored computer-executable program code 342 that enables the method of the invention (FIGS. 2-6) and enables display of user screens (FIGS. 7-14) on display 346 to comprise GUI 342. The general-purpose digital computer becomes a specialized unique and novel machine because of the code or logic 342, which in a preferred embodiment is software but may be hardware. Logic or code 342 may also be stored and read for operation on computer readable medium 352. A user input device 350, such as a well-known mouse or keyboard allows the user to interface with the computer including its special logic.

An Embodiment of Method Steps of the Invention

Now for a better understanding of an embodiment of method steps of this invention the steps are described in detail with reference to FIGS. 3-6, which are explained with reference to user interface display screens shown in FIGS. 7-14.

Figure 2:
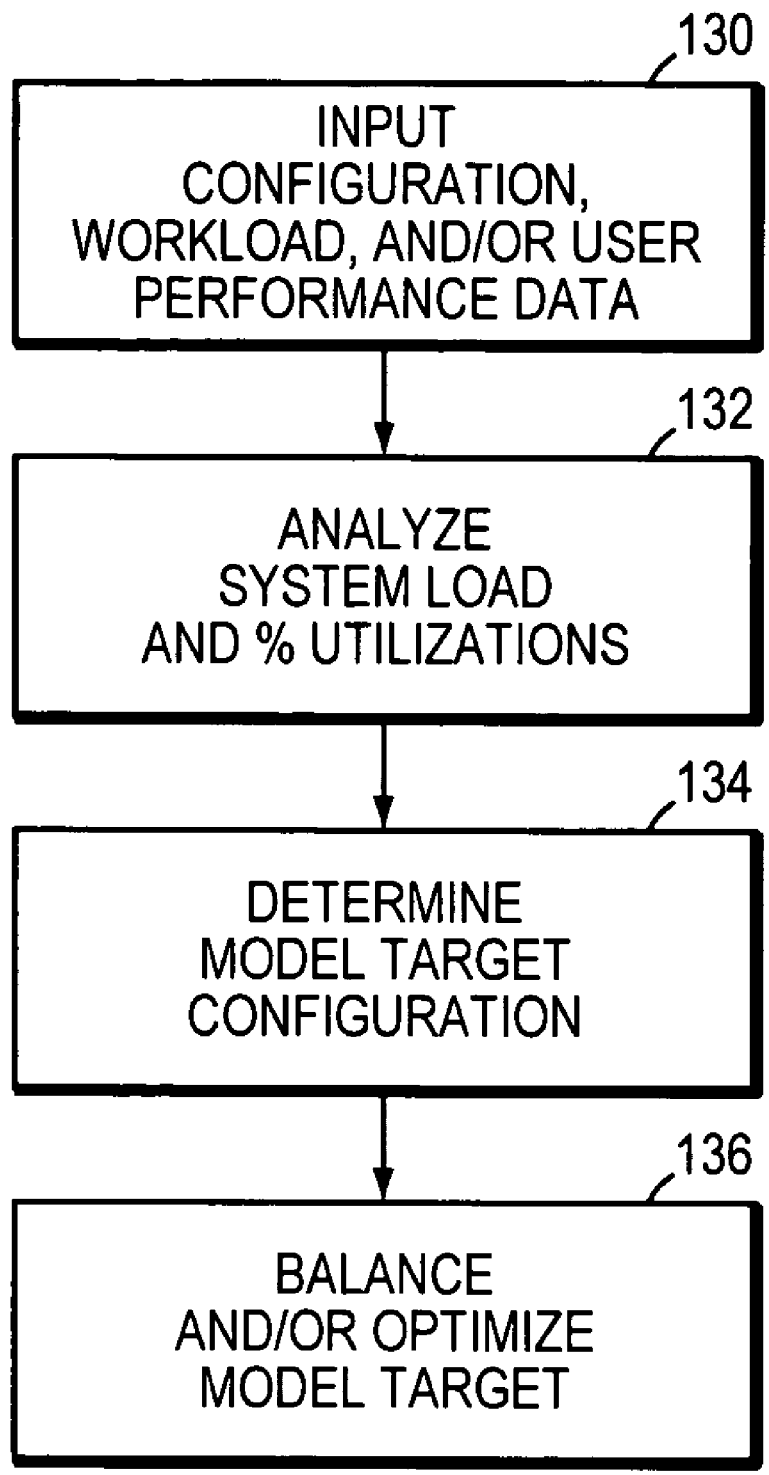
FIG. 2 is a flow logic illustrating an overview of an embodiment of method steps of this invention carried out by the performance system of FIG. 1.
Figure 3:
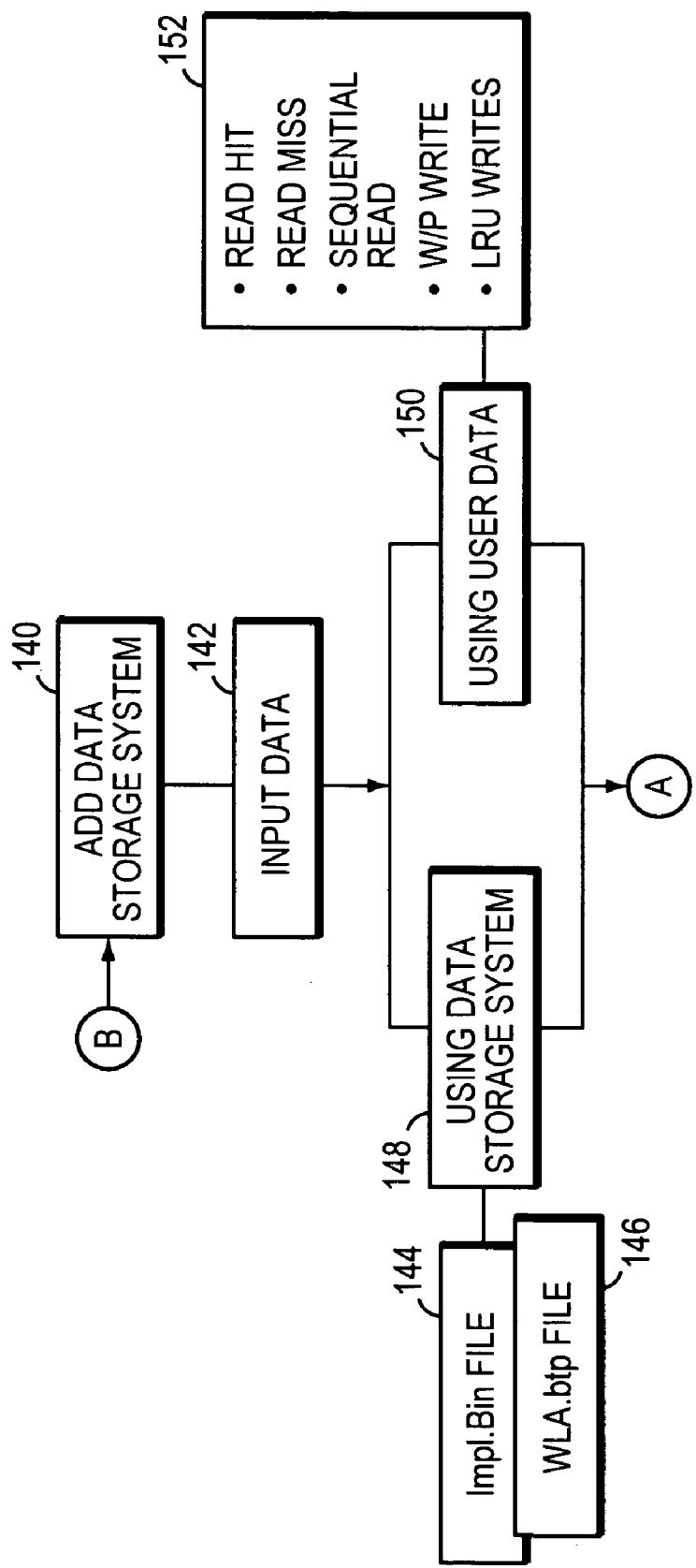
FIG. 3 is a flow logic diagram further showing illustrating the embodiment of method steps shown in FIG. 2.

Referring to FIG. 2, an overview of the method steps of simulation is shown, wherein the simulation action may include some or all of the steps shown. In step 130 input is given by a user or under computer control for configuration, workload, and/or user performance data. In step 132, the simulation tool 114 analyzes the system load and percent (%) utilization of each component in the system. Percent utilization refers to the amount of time a component or system is working versus its respective idle time. Using the analysis model target configurations can be determined in step 132 and the load may be balanced and/or the model target optimized for performance in step 136. Specifically how the general steps are carried out depend on the objectives of the user, i.e. using the tool for merging of two or more data storage systems or performance analysis for optimization or capacity planning or fault isolation and general design purposes. Other uses for the tool may occur to those skilled in the are in view of the teachings herein, and such uses should not limited except by the claims appearing herein and their equivalents, which may not be presently foreseeable.

Figure 4:
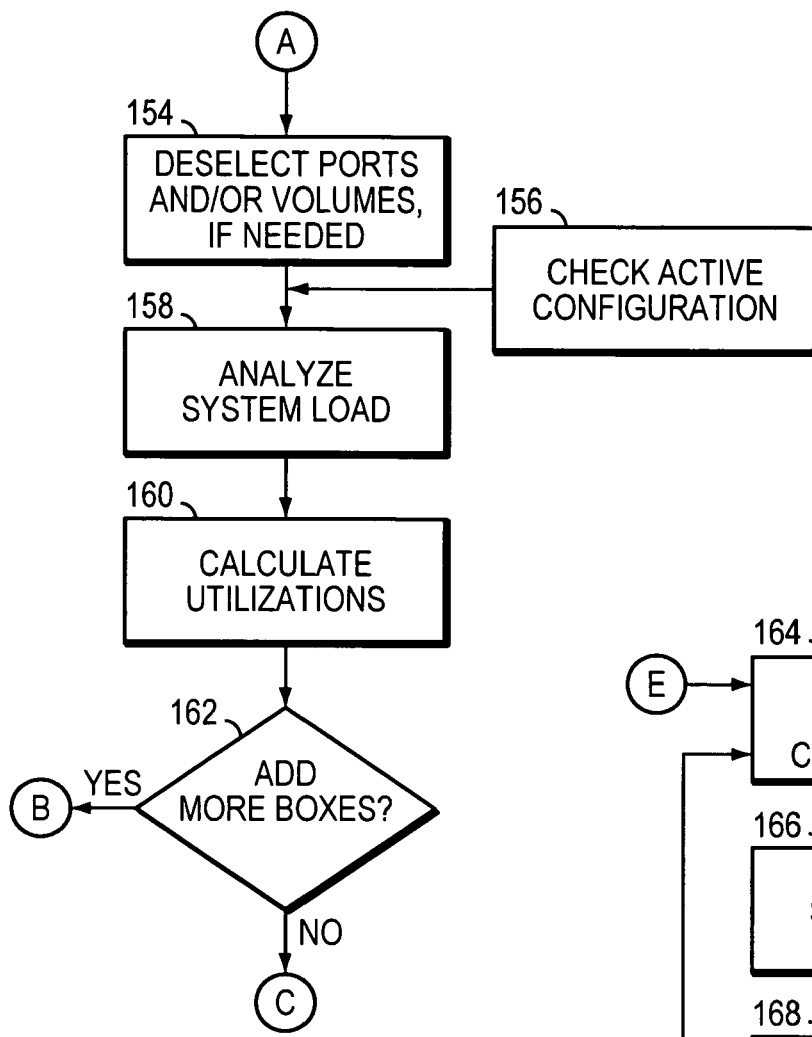
FIG. 4 is another flow logic diagram further showing illustrating the embodiment of method steps shown in FIG. 2.

Reference is made below to FIGS. 3-6, more specific road-map type of method steps for employing this invention are given and are best understood with reference to user screens shown in FIGS. 7-14. In FIG. 4, step 140 is directed toward "Add Box," which means determine whether a data storage system is to be merged, and if so its configuration data is added in step 142. The configuration data available from cache of the preferred Symmetrix or a service processor in communication with the data storage system is typically a binary (.bin) file that is added in step 142, and workload characteristics may be also loaded from the preferred EMC ECC Workload Analyzer (a .btp format) file in step 144. Alternatively if using user data in step 150, the workload characteristics desired, predicted, or needed based on the type of applications being processed on the data storage system can be added. For a particular data storage system, and for each type of I/O, the simulation tool 114 maintains a database of each component's execution, including factors such as time of execution and operation executed on each such component.

Performance characteristics such as IO operations are considered that include number of read hits, read misses, sequential reads, least recently used writes (i.e., re-writes), and write pending operations. A write operation means data is requested to be placed on the disk whereas a read operation means data is requested to be viewed but not changed and typically this involves loading from disk or electronic memory such as cache. Such cache or system memory is often employed to avoid mechanical lags associated with actual disk reads or writes. A random read hit means that data requested to be read from a random request was found in cache. On the other hand a random read miss means the data was not found in cache in response to a similar request. Sequential reads refers to a situation where a read request following an immediate preceding request is for data stored on disk in an immediately following sequence such as a data block. In such a case, cache can be used quite effectively to avoid going to disk, e.g., by pre-fetching a certain amount of sequentially arranged data from disk into cache. Least Recently Used writes (LRU writes) refer to regular writes to cache, which require standard LRU management. Write Pending writes (WP writes) refer to writes which are written into write pending (WP) slots in cache, which enable a more efficient write operation in terms of resource usage. An example of WP writes are cases where the same address in written and re-written a number of times over and over.

Whether using data storage system data (step 148) or user data (step 150), continuation step A flows into identical continuation step A shown on FIG. 4, and which in turn flows into step 154. In step 154, the user may deselect ports and/or volumes, which will decrease the workload on the data storage system, this may be done using the user interface screens described with reference to FIGS. 7-14 below. In step 156, the user may then check the check active configuration after such an action for meeting requirements, and then the system performance simulation system or tool can analyze system load in step 158 and calculate utilizations in step 160. If more boxes are to be added into a merge then the answer is "YES," to the query posed in the interrogatory step 162, and continuation Step B flows back into Step 140 of FIG. 3, and a loop of steps 140-162 repeats until the answer to the question is "No," and processing flows into continuation Step C which in turn flows to FIG. 5.

Figure 5:
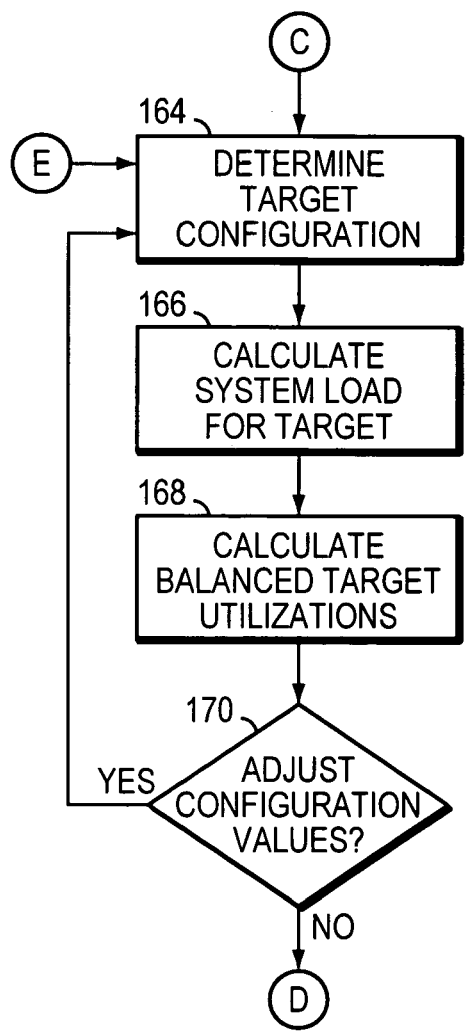
FIG. 5 is another flow logic diagram further showing illustrating the embodiment of method steps shown in FIG. 2.

Referring now to FIG. 5, after continuation Step C, the target configuration many is determined in Step 164. The system load for the target is calculated in Step 166, and a balanced target utilization is calculated in Step 168, so that if needed configuration values may be adjusted in step 170. If the values are to be adjusted ("yes," to the query of Step 170, then processing flows to continuation step E which in turn flows to Step 164 and the steps 164-170 are repeated until the query answer is "No." In such case, processing flows to continuation Step D and then to FIG. 6.

Figure 6:
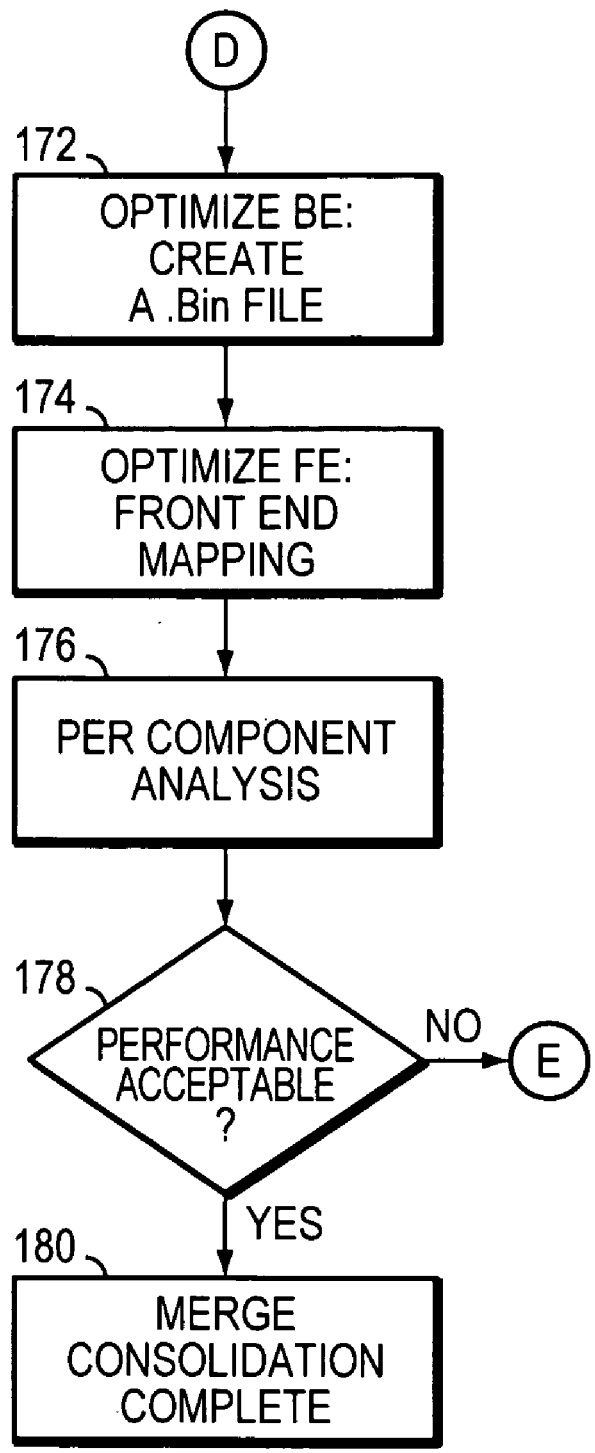
FIG. 6 is another flow logic diagram further showing illustrating the embodiment of method steps shown in FIG. 2.

Referring to FIG. 6, following Continuation Step D, in a preferred embodiment, the back end of the target storage system may be optimized, creating a binary file in Step 172 and the front end similarly optimized in Step 174. Then a component analysis in Step 176 will identify any problem components or areas, which will be further explained with reference to FIGS. 11-14 below. If the performance is acceptable, or the query posed in step 178, then the merge consolidation is considered complete in step 180, but if not then continuation E is followed to return processing back to Step 164 (FIG. 5) and a loop continues through to Step 178 until the performance is deemed acceptable. Techniques for increasing performance and in accordance with the steps above include reconfigure the data storage system to have more resources, or 'faster' components, such as Fibre channel and over the well-known SCSI interfaces.

Figure 7:
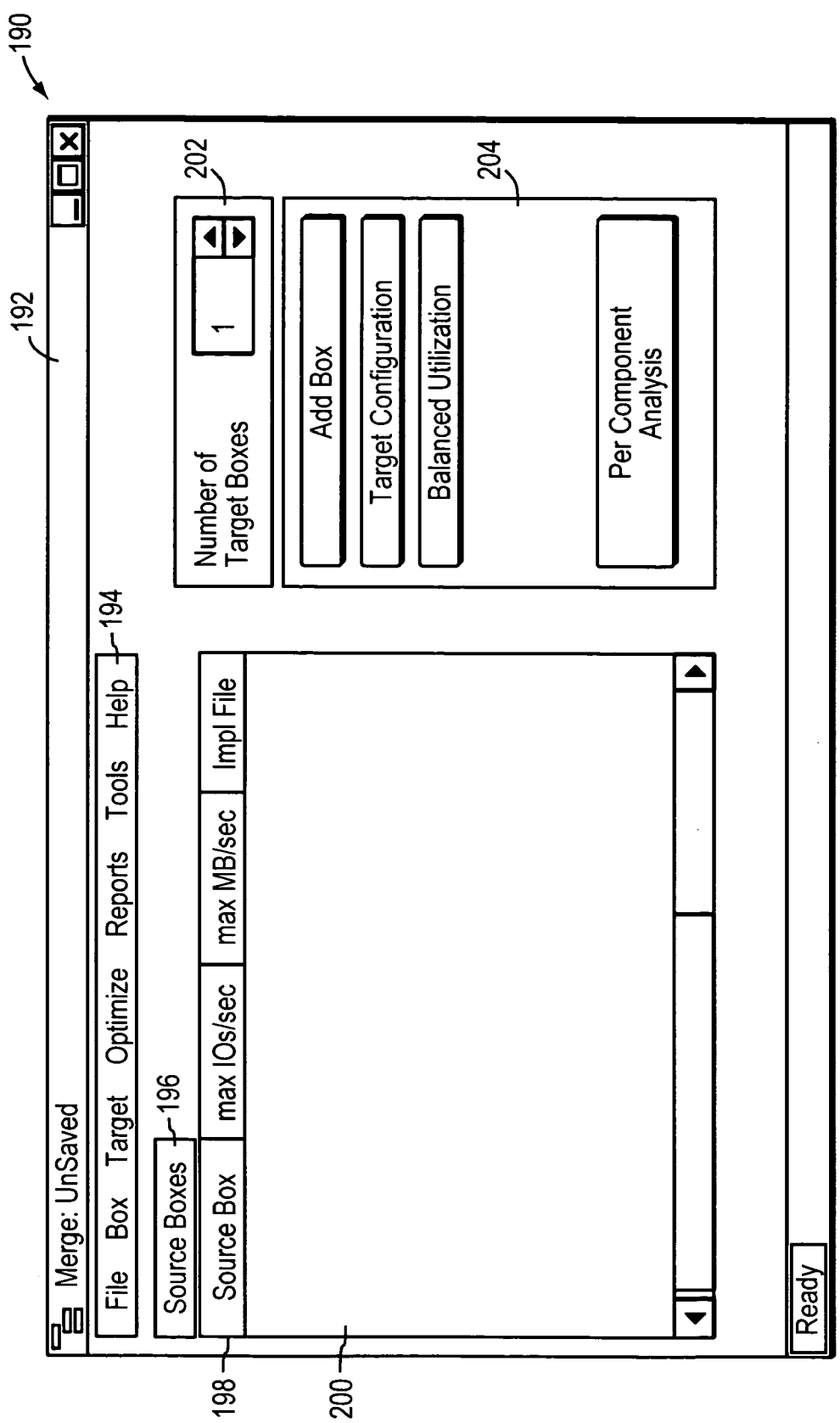
FIG. 7 is an exemplary representation of a user interface screen for allowing use of this invention.

Example of user interface screens for carrying out some or all of the method steps described above are shown in FIGS. 7-14. Referring to FIG. 7, screen 190 including menu action bar 192 with user actions 192 (e.g, file, box, target, optimize, reports, tools, and help) is presented for a user who wishes to merge or consolidate data storage systems as described above. Clicking on the "Source Boxes" field 196, presents user information area 198, including "Source Box," "Max IO's/sec, "max MB/sec," and may also contain other performance characteristics fields (not shown for simplicity). A message area 200 is available for conveying related information to a user. The user may specify the number of target boxes for the merge in field 202. Field area 204, inclusively has several action field buttons including "Add Box," "Target Configuration," "Balanced Utilization," and "Per Component Analysis."

Figure 8:
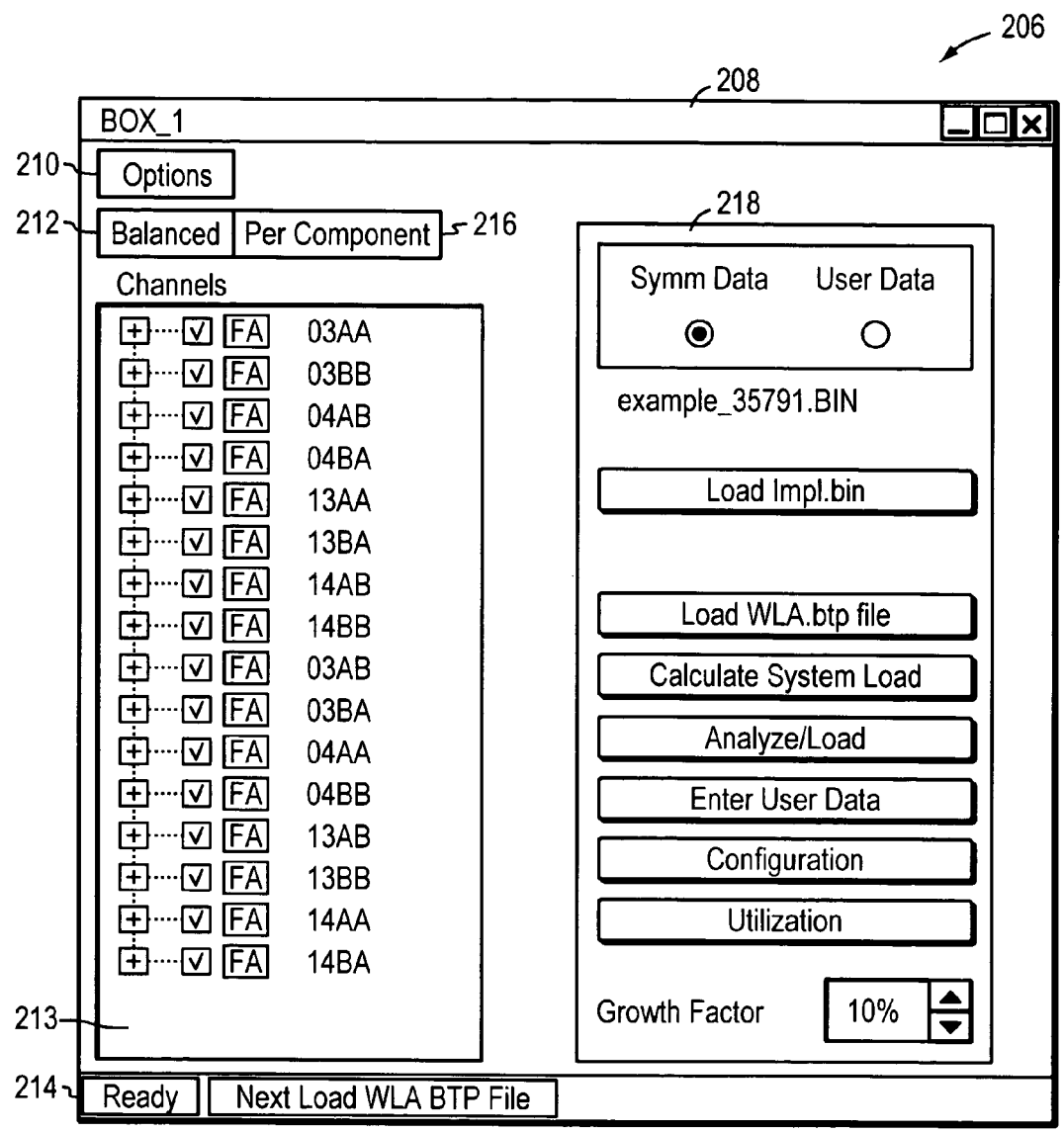
FIG. 8 is another exemplary representation of a user interface screen for allowing use of this invention.

In FIG. 8, an example screen 206 is shown. Once a user has made a particular box selection identified in field area 208 (in this example "Box_1") the type of desired action may be chosen using the Options button 210. Field area 212 shows a balanced option selected to a current system for consolidation (the volumes included are shown in the message area) 213. Field area 218 allows selection of whether a data storage system data (e.g. Symmetrix or Symm Data) or user data, and then a selection of a configuration binary file to load. Other actions selectable in user area 218 include "Load WLA btp file," wherein performance characteristics are selected from the preferred WLA file as described above. Other user-selectable actions include "Calculate System Load," "Analyze Load," "Enter User Data," "Configuration," and "Utilization." The user may also estimate the amount of growth expected, e.g. 10%.

FIG. 9 shows a user interface screen 220 useful for checking and adjusting a configuration of a data storage system, either the target system on one under investigation. Conveniently, there are two action tabs provided in the screen window: "Complete" tab 224 and "Active" tab 226. The Complete tab displays the configuration found in the preferred Impl.bin file and displays the configuration of the entire system. A "Box Type" tab in the presented window area of tab 224 allows the user to select the appropriate data storage system type, e.g., the example Symmetrix 5x or Symmetrix 4.8 type systems. Selecting the appropriate system allows the simulation tool 114 to adjust the resources to reflect the user's choice. For example, the number of logical volumes (#LVs) in the Complete window shows the total number of logical volumes in the box, whether or not they are mapped to the back end in the preferred example Symmetrix data storage system.

FIG. 10 shows the window presented on screen 220 when the Active configuration tab is selected. This window displays only the active resources (e.g., channels/logical volumes) a user has selected, and takes into account only the active resources chosen. The number of logical volumes (#LVs) in the Active window shows only the number of active logical volumes (those that contribute to the system load). Other information is also presented which one skilled in the art will recognize that in combination with the method steps and the system overview presented above provides an advancement in the computer arts. This invention is not to be limited by the examples given, but only by the claims are their equivalents, some of which may not be foreseeable at present.

Figure 11:
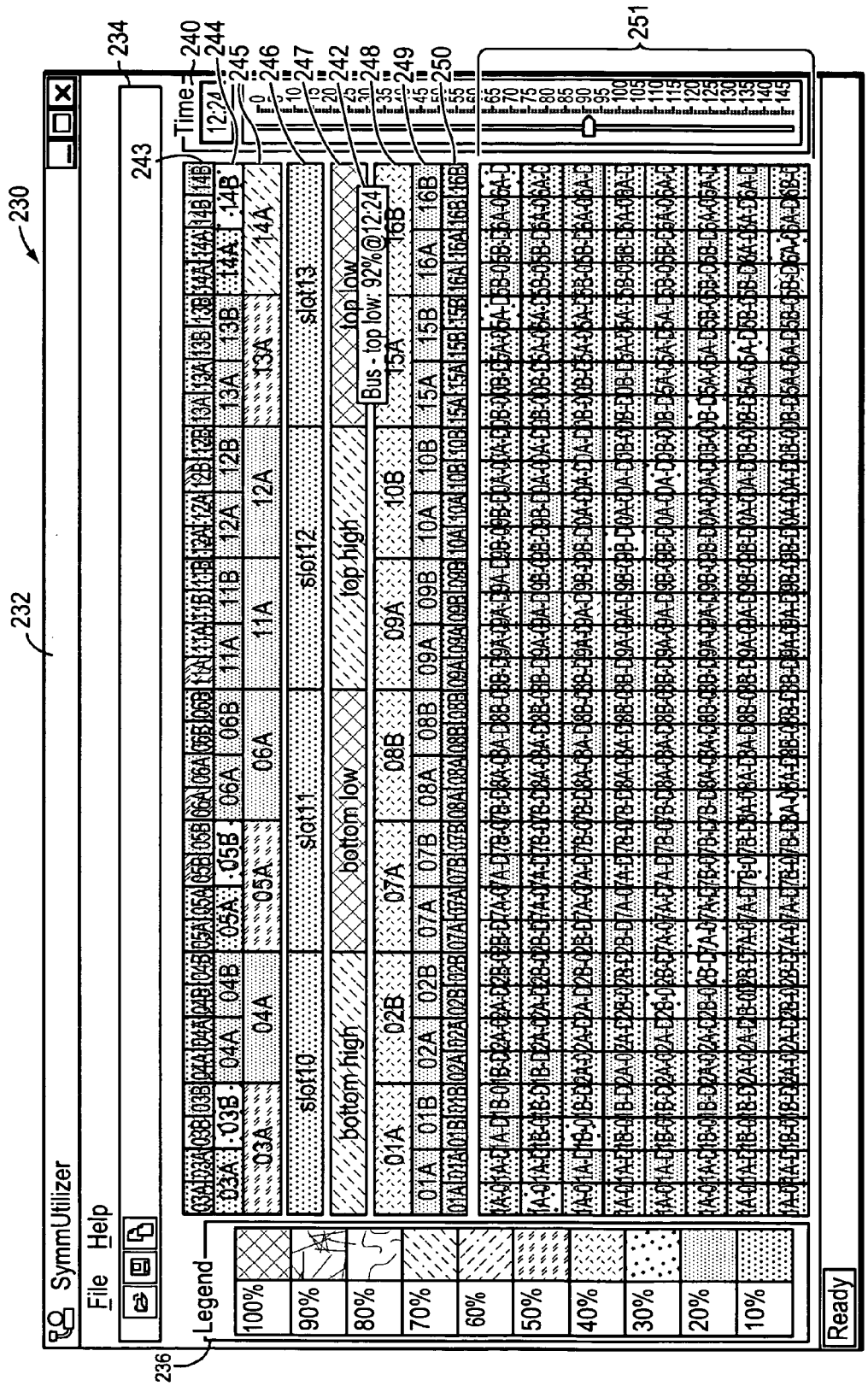
FIG. 11 is another exemplary representation of a user interface screen for allowing use of this invention.

FIG. 11 shows a component analysis map screen 230 of an entire data storage system. The tool 114 enables a user to view utilization of each component in a source or target data storage system. The option is provided to view in graphical (FIGS. 12 and 13, discussed below) or map format (FIG. 11). The mapped view represents the maximum utilization of each component over all the timestamps or per a particular timestamp (i.e. point in time). A title area 232 and action menu bar area 234 serve to respectively inform and allow the user to interact in conventional ways of Windows based software. However, the rest of the mapped view presents a completely novel way for a user to explore the utilization and potential problems of a target or current data storage system. Area 238 generally shows the utilization of each component, which is color coded, e.g. using red to identify over-used components (shown here in FIG. 11, as graphically coded due to lack of color drawings used herein) to a usage chart shown in Legend area 236. A timestamp area 240 allows the user to look at usage over any selected time.

Generally, regarding identification of components in the presented window of screen 230, the following applies, for this example. Presented from top to bottom on screen 230 (FIG. 11) are: area 243: front-end ports; area 244: front-end CPUs; area 245: front-end boards (i.e. the components on board to the bus; area 246: memory boards; area 247: buses; area 248: back-end boards; area 249: back-end CPUs; area 250 back-end ports; area 251: physical disks identified by volume id's. This example is of course for the preferred exemplary case of an EMC Symmetrix Data Storage System. However, one skilled in the art will recognize the general mapping scheme would apply to any data storage system other than the exemplary case.

Returning to the exemplary case shown in FIG. 11, when a mouse cursor is moved over a component screen representation, e.g. example component screen representation 242 in general screen area 247 the utilization is shown presented on the screen for the user to read. In the presented example, The Bus-top low: is being used at 92% utilization at the time 12:24. This implies alarmingly high traffic and alerts a user of potential problem areas to address for the target or current system. It should be understood, that the invention enables, although not shown in the drawings simple text messages (not shown) related to utilization or other performance considerations. Also, a user can simply tell a lot by glancing at the easy to read map, e.g. many disk drives, e.g. volume 1A-0 are being under-utilized, 10% in the example, while others, e.g. volume 9A-0 are being used at a good rate of about 40%. Thus, the invention, along with its other advantages, is also useful for determining utilization of each component in a system and for determining utilization of a system itself, whether the system is being currently employed or is one being simulated, or modeled, for design purposes or for consolidation or capacity planning or general performance analysis. Moreover, the simplicity of using the tool 114 allows those with simple skills in the computer area to make well-reasoned decisions regarding data storage, heretofore, an area requiring complex skills and a wealth of hard-earned experience.

Figure 12:
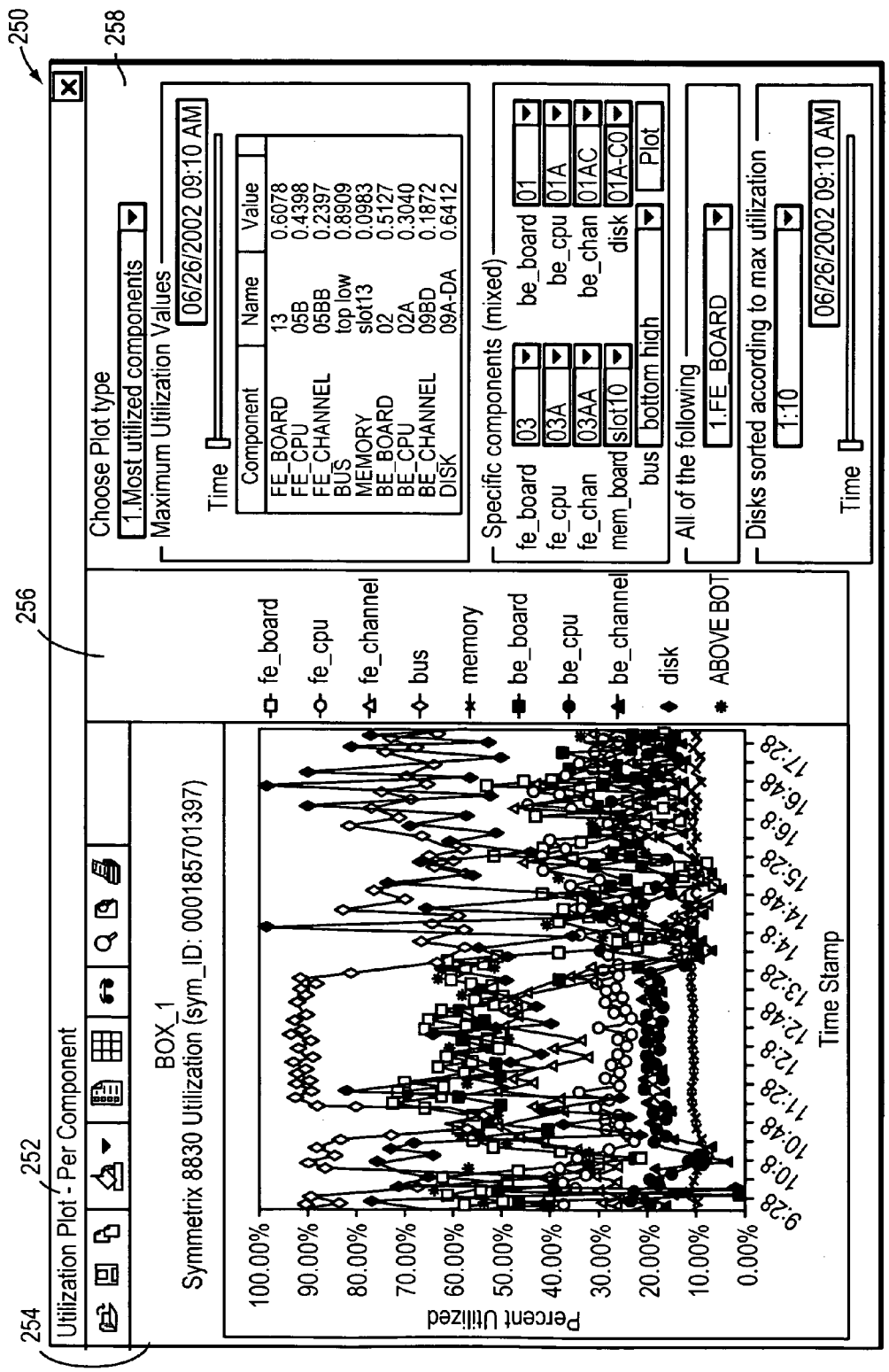
FIG. 12 is another exemplary representation of a user interface screen for allowing use of this invention
Figure 13:
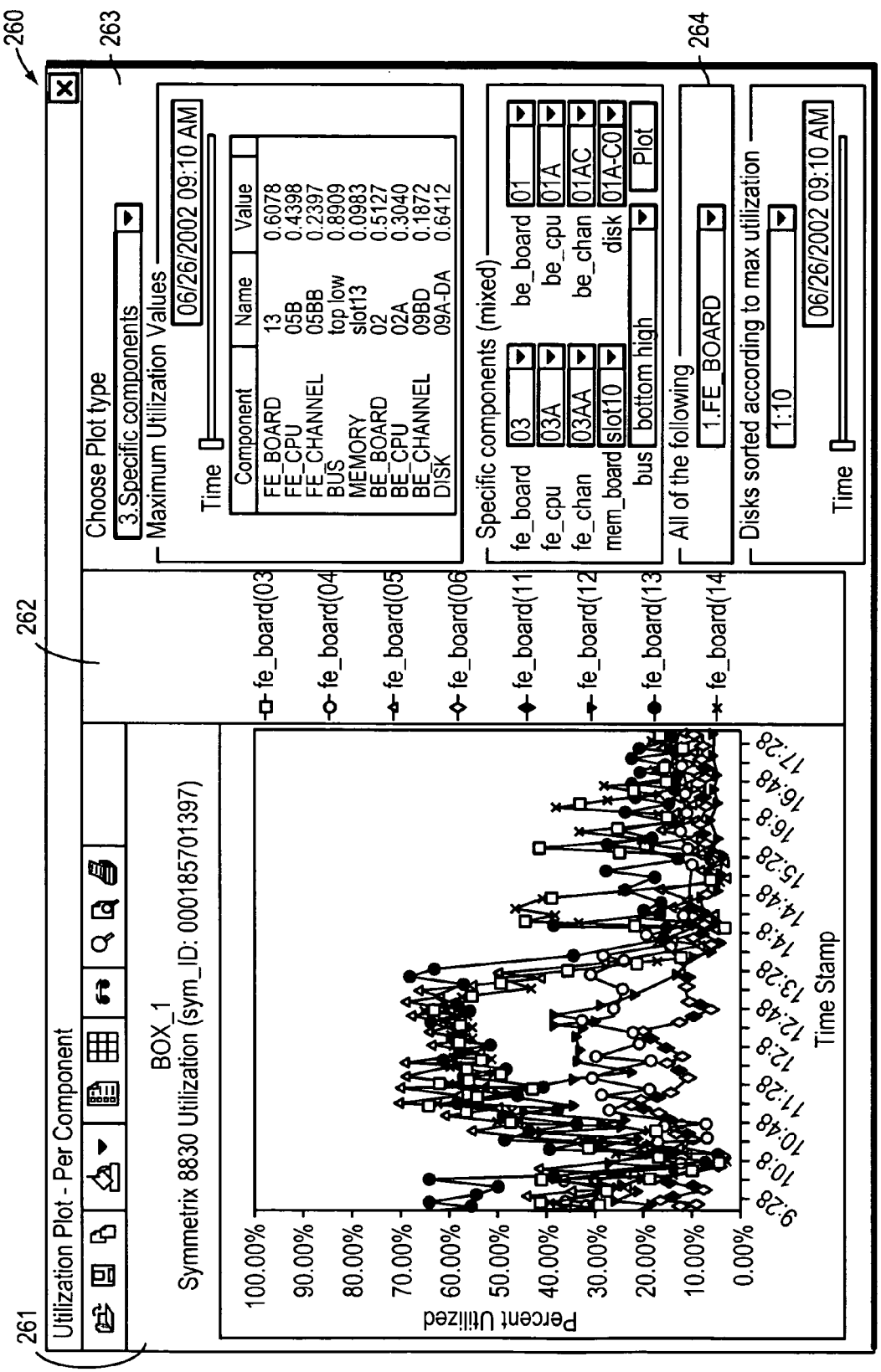
FIG. 13 is another exemplary representation of a user interface screen for allowing use of this invention.

Reference is made below to FIGS. 12-14. FIGS. 12 and 13 show a performance graph 254 and 256 on screens 250 and 260, respectively. FIG. 12 shows utilization for an entire data storage system, while FIG. 13 depicts what is visible for a user who selects a particular component, in general component selection 258 (FIG. 12) and 263 (FIG. 13) wherein in this example front-end boards for a preferred EMC Symmetrix data storage system are selected in field selection area 264 (also FIG. 13). For each screen, a toolbar 252 is located at the top of the screen. The toolbar contains buttons for performing tasks such as saving and printing the chart in a format generally known by users of operating systems such as Microsoft. The vertical axis on graphs 254 and 260 (FIGS. 12 and 13, respectively) represents resource utilization in percentages. The horizontal axis represents time periods for given workloads. The lines or performance curves in the graph show snapshots of the utilization data over specified time periods. FIG. 14 is a screen 280 showing a graphical map 282 of utilization of just the disks that are individually identified by volume identifier area 282. Area 284 allows user selection similar to that described above with reference to FIGS. 12 and 13.

When considering utilizations the following points are factored by the tool and the user may also consider when using the tool. Consider the following when analyzing utilizations. Loads and utilizations do not necessarily behave empirically in a linear manner. For example, if one measures a 60% utilization for a particular workload, adding 10% to this workload may result in a 90% utilization, not 70%, as one might expect. Therefore when analyzing utilization, it is good practice to consider granularity or resolution. Utilization calculation is based on reports, which average the data on a very large granularity, but real I/O bursts in a typical workload environment that a customer may see. In consideration of this the simulation tool offers through the user interface screens described herein two options: a "Balanced" option assumes the load to be evenly distributed between all the resources, and a "Per Component" option reports the actual utilization for each component. The analysis of the utilizations for a given data storage system may be different for different components. The X-axis on the Utilization charts warns the user of potential bottlenecks and various options and changes are allowed to reach desired optimization in view of the analysis.

Figure 16:
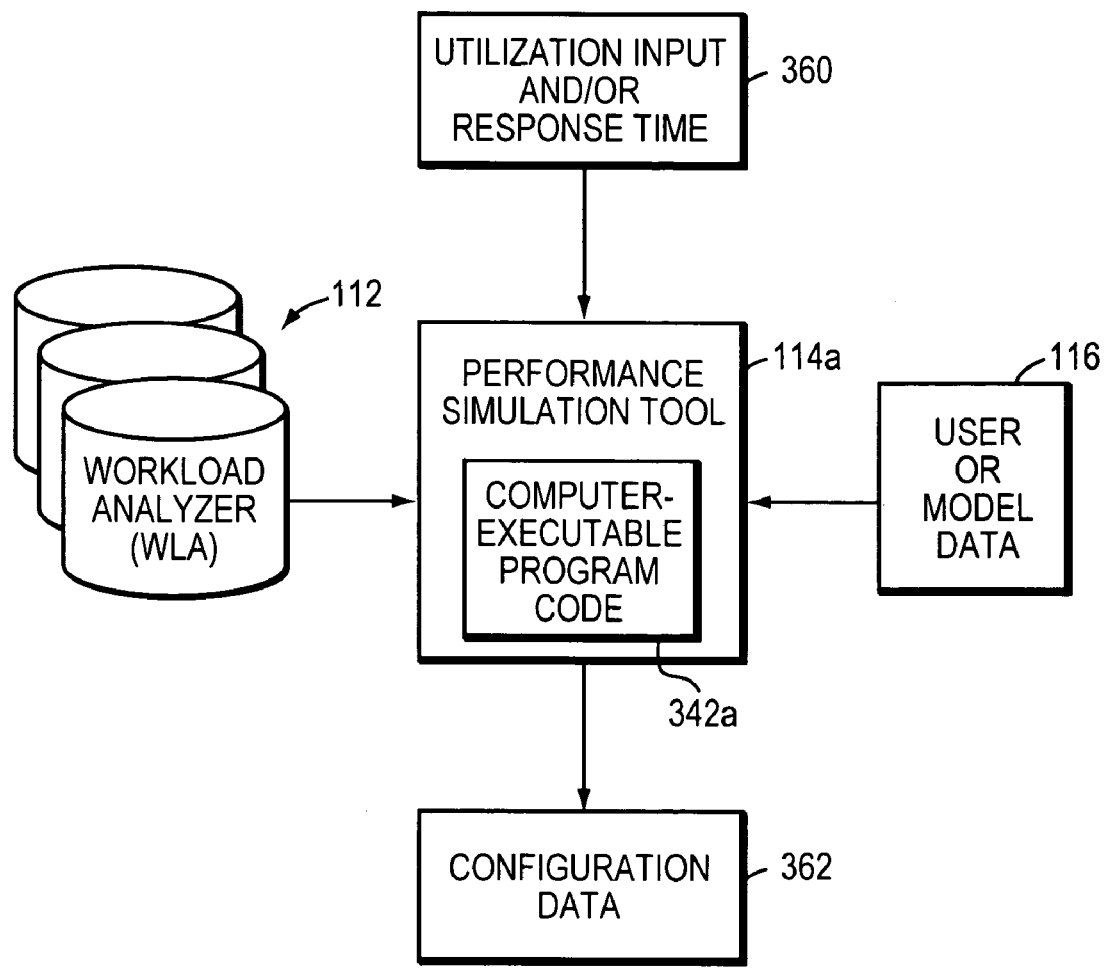
FIG. 16 shows an alternative embodiment of a computer-based tool that may be used to determine a configuration based on workload or utilization.

FIGS. 16-22 show an alternative embodiment wherein utilization and/or response of a system can be inputted into an alternative embodiment Performance Simulation Tool 114*a* and Computer Executable Program Code 342*a* (each shown in FIG. 16) that can be used for receiving the utilization and/or response time of a system and in turn recommend a number of preferred systems configurations to satisfy such use requirements. Also in this alternative embodiment workload data from the workload analyzer 112 and/or user or model data 116 may be inputted and analyzed as shown in FIG. 16.

Calculating the utilization of a system (or in other words, calculating how busy a system is) is a complex calculation. The input required for such calculations includes the workload on the system and the exact configuration of the system. An embodiment of this invention discussed above in relation to FIGS. 1-15 provides this ability and allows a user to troubleshoot issues that a current system may have and also simulate a "what if" scenario by changing any of the input parameters and analyzing the utilization of the modified system. The inventors have also critically recognized a need for a different approach wherein input of the workload and required utilization of a system can be analyzed by the tool which recommends a number of substantially optimal system configurations that can sustain the requirements. This is the new invention is discussed below with reference to FIGS. 16-22. It should also be understood that the new Program Code 342*a* may also be implemented as part of computer-readable medium 352 and alternated with Computer Program Code 342 as shown on FIG. 15.

One problem that this alternative embodiment resolves is elimination of the need for a user to go through a number of iterations, where in each iteration he would be required to specify a configuration and analyze its utilization until he would hopefully converge into a satisfying solution, but not necessarily an optimal one. Such a prior art process would be time-consuming and require some proficiency and knowledge from the user that is lacking in the typical user, or is at least in short supply. This alternative embodiment is particularly advantageous when it is known that a data storage system will need to withstand a specified known workload. In such a case the user may simply choose and define a baseline from which he can fine-tune if other considerations are required.

Referring now to FIG. 16 to use the new alternative embodiment, utilization and/or response time input is made in functional-block 360 and passed to the performance simulation tool 114*a* including program code 342*a* which may also accept data from the workload analyzer 112 and/or user or model data 116 in an identical fashion as the embodiment described in FIG. 1. Then Configuration data is available from the tool based on the input after processing takes place as described below and as shown in functional block 362.

Figure 17:
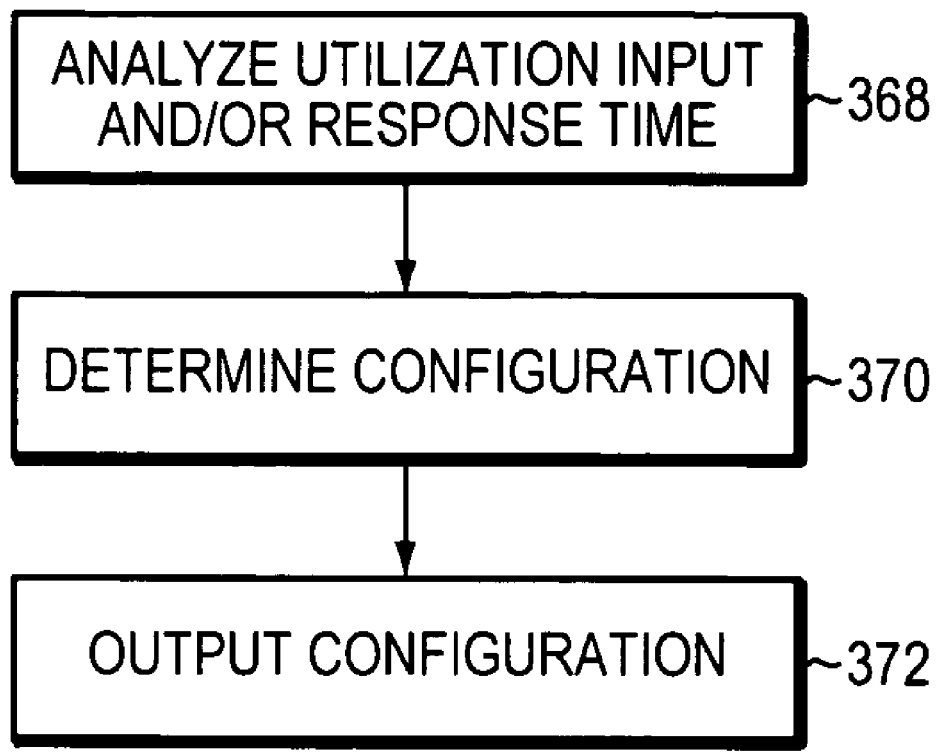
FIG. 17 shows an overview of a method of using the tool of FIG. 16.

The overall process is shown in concisely in FIG. 17. The utilization and/or response time requirements are analyzed from the input in step 368. The configuration is determined in step 370. The configuration is the given as output in step 372. Details and underlying concepts involved in these steps are now discussed below In addition to the workload or use requirements, total capacity is assumed to be given, and optionally the number of host ports may also be given. Such information is usually included in basic requirements and known where workload is known. Below is specified the procedure of analyzing the anticipated workload, computing the utilization of each system component, and determining the optimal configuration. In step 368, wherein the anticipated workload is analyzed the tool computes how much load each component in the workload is exerting on each system component. The workload components considered preferably include:

Read Hit: Percentage of I/Os that reread data from cache
Read Miss: Percentage of data that is read from disk in a random manner
Sequential Read: Data that is read sequentially, and, therefore, is prefetched in relatively large blocks.
Random Write: Percentage of I/Os that write data to a track not in cache
Rewrite: Percentage of I/Os that write data to a write-pending track
Sequential Write: Percentage of I/Os that write data sequentially, and, thus, give a chance to destage data in large blocks.

Next the step of analyzing the utilization input includes computing the utilization of each system component. In an exemplary EMC Symmetrix data storage system, the system components considered may include the number and storage capacity of storage disks, back-end directories, back-end processors, memory boards, front-end directors, and front-end processors. Once such parameters are given to the tool then the configuration can be determined in step 370 and given to the user as output in step 372.

Figure 18:
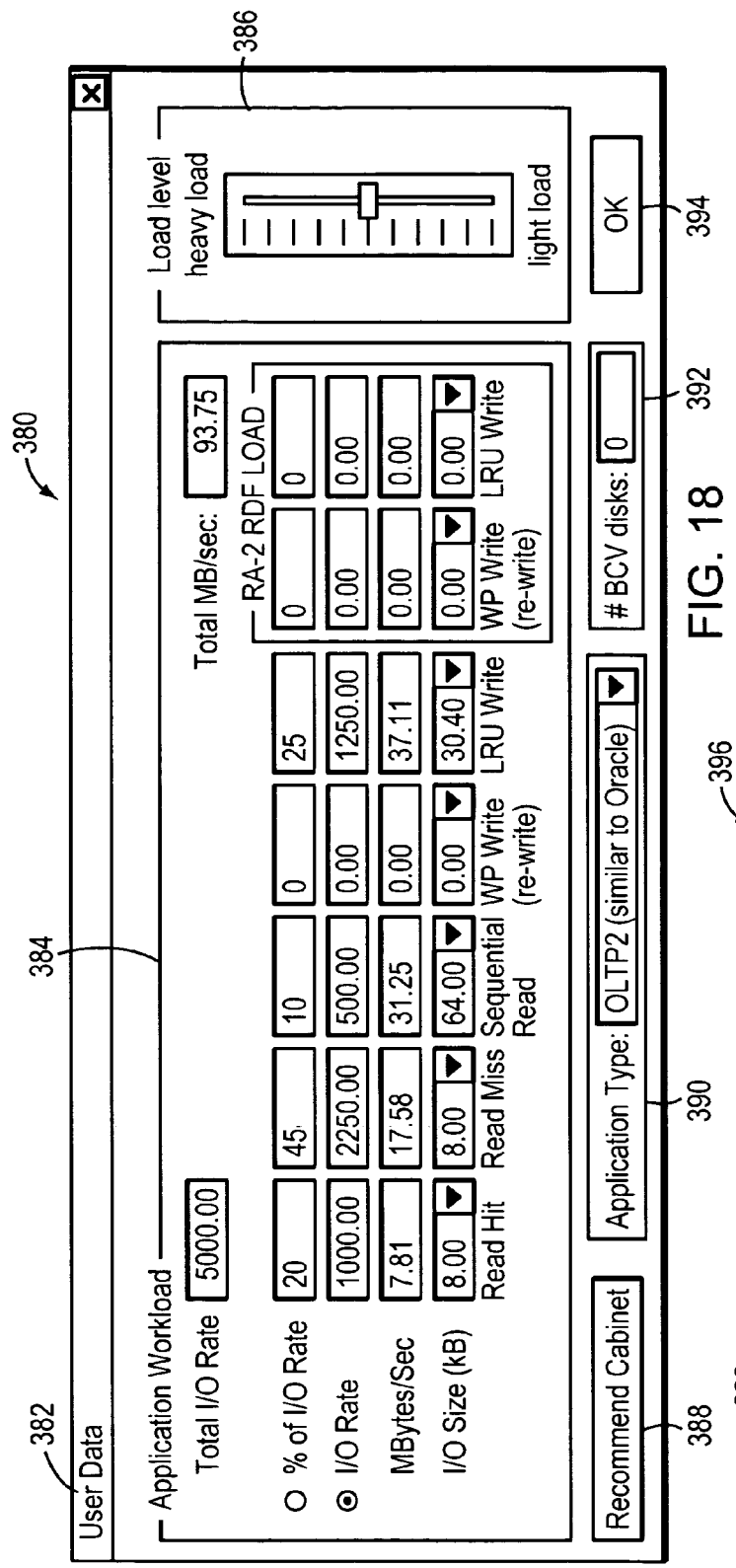
FIG. 18 shows an exemplary user data screen showing user data including user data input fields.

FIG. 18 shows an exemplary data user input screen 380 identified as user data in filed 382, wherein input can be entered in the numerous data entry fields on field-area 384. In the shown example the total I/O rate is 5,000 with a total transfer rate of 93.75 MB/sec rate available. For given I/O rate percentages the I/O rate is given and the resulting transfer data rate (MBytes/Sec) and I/O size (kB), and the conditions of read-hit, read-miss, sequential read, re-write, and LRU writes under such conditions, and the user may use the convenient toggle slider in field 386 to adjust workload level between a heavy and light load. The user may then use radio-button 388 to input a preferred data storage system recommendation (referred to simply as cabinet) and more about the parameters entered here are discussed with reference to FIG. 19 below. In fields 390 and 392, the user may input the application type and number of mirroring disks (BCV refers to business continuance volumes in the exemplary Symmetrix data storage system). If all input is OK the user may so indicate using field 394.

Figure 19:
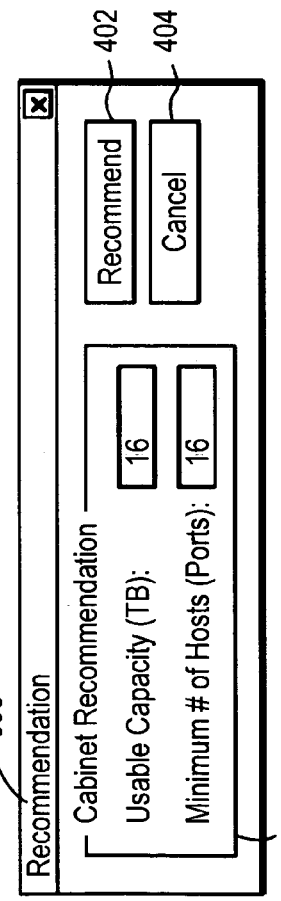
FIG. 19 shows another exemplary user data screen showing user data including user data input fields.

In FIG. 19, the user may recommend cabinet inputs by defining the host ports and capacity, wherein such inputs are entered in field area 400. The user may choose to use this as the input used as the cabinet recommendation input prompted from field 388 (FIG. 18) in field 402, or cancel in field 404. Once this information is entered and OK is clicked on in field 394 (FIG. 18), the tool determines the configuration and outputs the configuration in the form of a report.

Such an exemplary report is shown below in Table 1.

TABLE 1

SymmMerge V3.06.010 -- All results produced by this tool are performance estimates only
The Recommendations within this report do not consider BCV, RDF, or Safety Factor.
Recommendations for DMX 1000 RAID 7 + 1 CH146LP 128 DISKS (16.35 TB)

| Configuration Details: DMX1000 | | | | | |
|---|---|---|---|---|---|
| LRUs: | 8 | Buses: | 16 | | |
| Memory Size GB: | 32 | BE Boards: | 2 | FE Boards: | 2 |
| Memory Boards: | 2 | BE CPUs: | 8 | FE CPUs: | 8 |
| Memory Areas: | 4 | BE Channels: | 16 | FE Channels: | 16 |
| RAID-R Cheetah 146: | 128 | | | | |
| Maximum Utilizations: | | | | | |
| FE Board: | 11% | FE CPU: | 10% | FE Channel: | 4% |
| RA1 Board: | 0% | RA1 CPU: | 0% | RA1 Channel: | 0% |
| RA2 Board: | 0% | RA2 CPU: | 0% | RA2 Channel: | 0% |

TABLE 1-continued

SymmMerge V3.06.010 -- All results produced by this tool are
performance estimates only
The Recommendations within this report do not consider BCV, RDF, or
Safety Factor.
Recommendations for DMX 1000 RAID 7 + 1 CH146LP 128
DISKS (16.35 TB)

| Bus: | 17% | Memory: | 13% | Disk: | 43% |
| BE Board: | 25% | BE CPU: | 33% | BE Channel: | 6% |

Performance Utilization is acceptable for DMX 1000 RAID 7 + 1
CH146LP 128 DISKS (16.35 TB)

Figure 20:
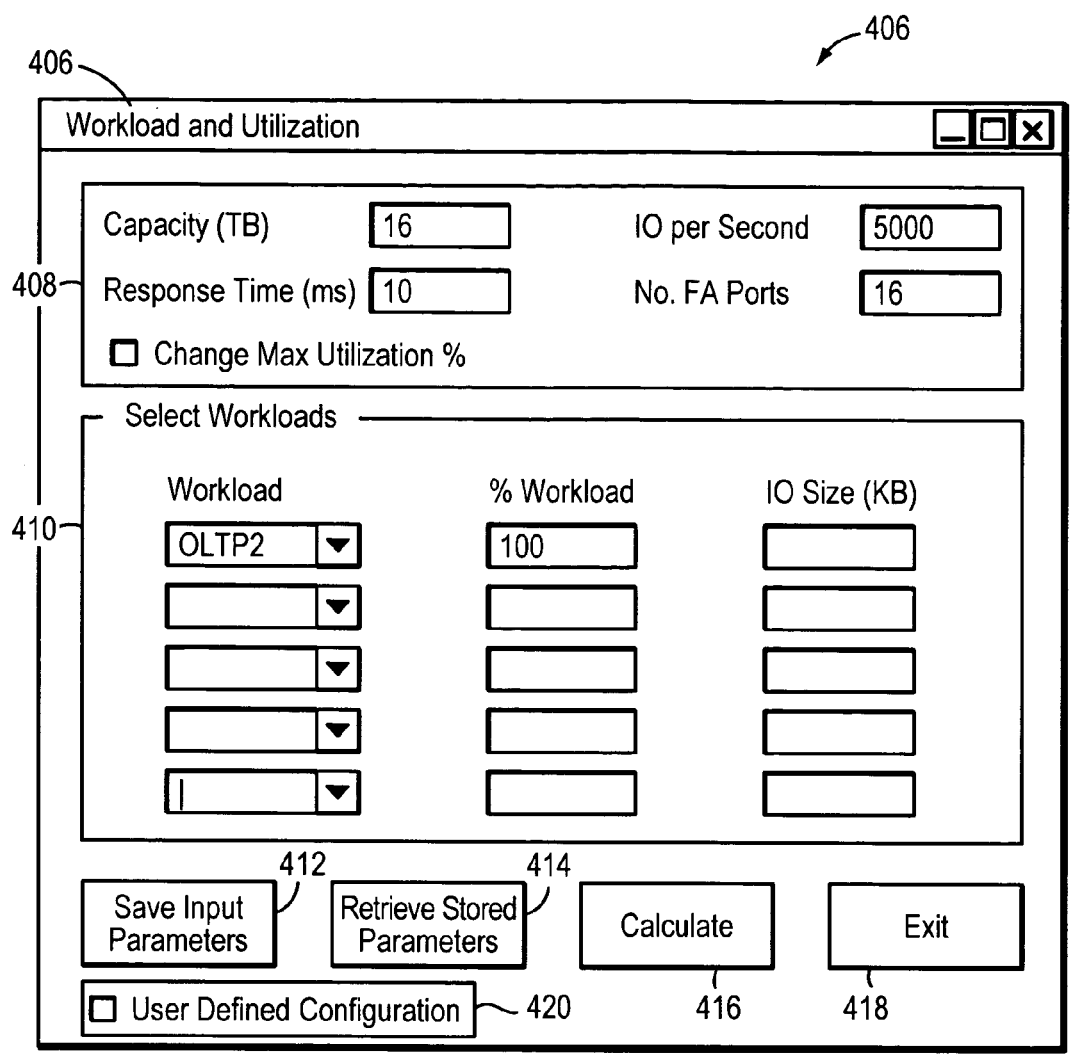
FIG. 20 shows another exemplary user data screen showing user data including user data input fields.

An exemplary interface user screen 406 for the tool is further shown in FIG. 20, including a title field area 406 indicating that workload and utilization are now considered. In field-area 408 the user may confirm the capacity, which in the example is 16 TB, the I/O per second of 5000, the acceptable response time of 10 ms, and no of front-end (FA) ports as 16. Maximum utilization may also be changed in this field-area. In field-area 410, workload may be selected, and parsed by application. In this example 100% of the workload is attributed to the OLTP2 database application. Input parameters may be saved using radio-button 412, or stored parameters may be retrieved by clicking on the button 414. The user may choose to click "calculate" or "exit" by clicking buttons 416 and 418, respectively.

Figure 21:
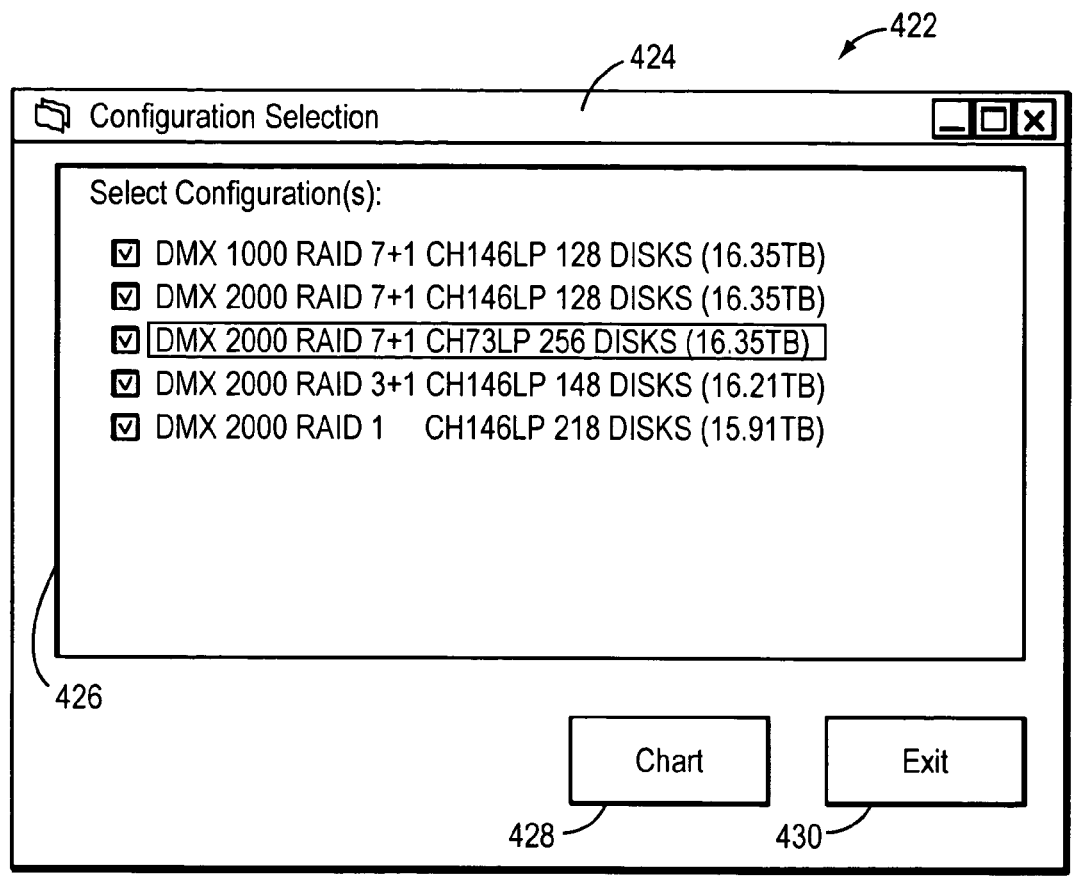
FIG. 21 shows another exemplary user data screen showing determined data including user data input selection fields.
Figure 22:
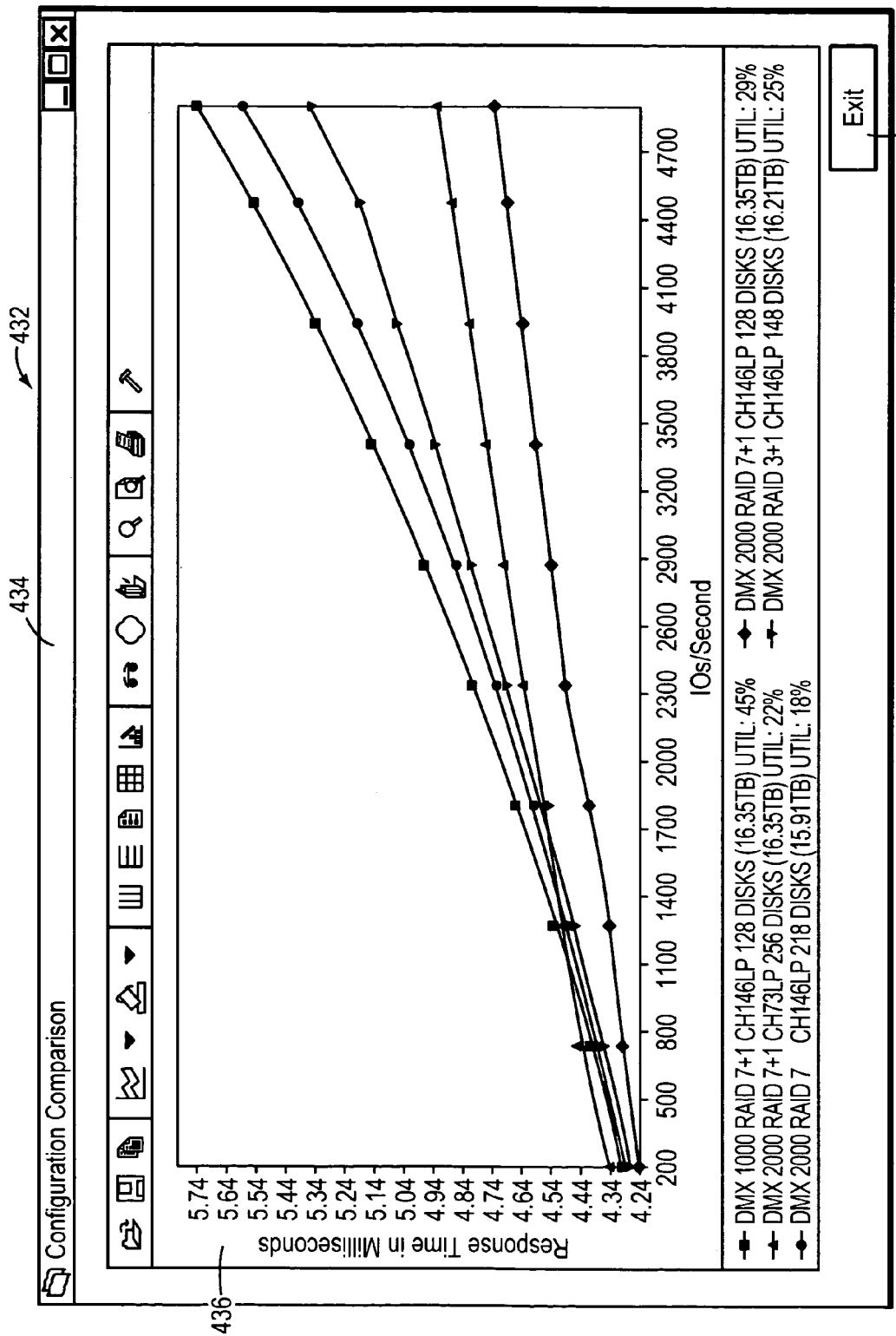
FIG. 22 shows a user display screen showing a comparison of configurations determined from user data input in FIGS. 18-21.

Reference is now made to FIGS. 21 and 22. FIG. 21 shows the user configuration selected after the user clicks "calculate. Screen 422 is entitled "Configuration Selection" in field 424 and several options are presented for the user in field-area 424, and for each that the users selects (shown in the example by a user placed check mark), the results are graphed to show a comparison in FIG. 22. FIG. 22 shows such a graph presented on user screen 432 entitled Configuration Comparison in field 434. Field area 436 shows a graph of each selectable configuration, wherein the plot key is shown related to each system at the bottom area of area 435. The plot of each configuration compares by showing the response time in milliseconds on the "Y" axis and the IO's per second on the "X" axis. User tools are available on the toolbar area at the top of field area 436. Given this information the user has good choices available for a configuration based on the workload requirements and may need only next to consider budget and such details to make a choice.

The inventors have critically recognized several uses and advantages for the alternative embodiment discussed in reference to FIGS. 16-22. One advantage is that such configuration information may be use to consolidate more than one old system into a new system, where the input is the utilization and or the response time required and may include the workload from all the old systems, and the out put will be the configuration of the proposed new storage system.

Another use involves analyzing one or more storage systems based on utilization, response time, or workload and then determining a recommended configuration that would overcome performance bottlenecks that might exist with a lower capacity system, while also not un-economically over-sizing the capacity needed. Thus the tool would not only indicate where a performance problem lies, but would also suggest a configuration that would resolve the issue by proposing a configuration that would sustain the load for a given required utilization, response time, or workload.

For example the tool could indicate that the back-end CPUs are highly utilized, causing some performance impact to the host applications. A trained user would know he needs to add more back-end CPUs and spread the workload across all the back-end, however, he would also have to iterate a number of different configurations until he would know how many back-end CPUs are required to sustain the workload. Implementing the present invention would be able to suggest the right number of back-end CPUs, which will guarantee a specified required utilization of the system.

Figure 23:
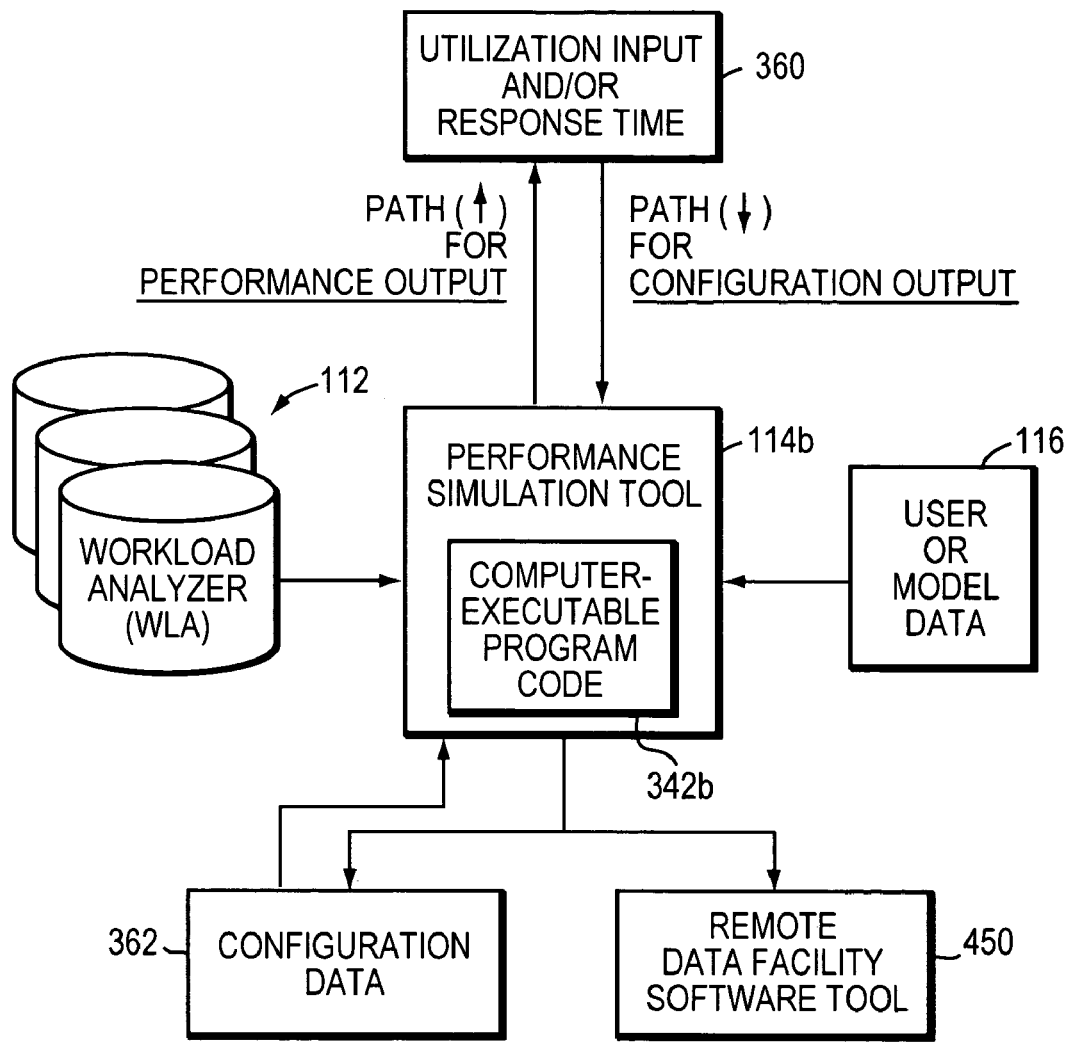
FIG. 23 shows an alternative embodiment of a computer-based tool that may be used to determine a configuration based on workload or utilization and includes a software tool useful for capacity planning or performance simulation for a data storage environment including a remote data facility for data replication.

FIG. 23 shows another embodiment useful for determining a configuration, or capacity planning, or performance simulation for data storage environment including a remote data facility for remote replication of data. It includes the same elements as those of FIG. 16 and a remote data facility software tool 350 useful for the above-described determinations. Computer-executable code 342b on Performance simulation tool 114b includes the tool 350 and may be embodied on the computer-readable medium shown in FIG. 15. The tool may be used for output of performance data based on configuration data or visa-versa as depicted in FIG. 23 by showing alternate paths for either performance or configuration.

It is helpful to understand considerations of a remote data facility for replication that have critically recognized by the inventors of the present invention. Such are described now with reference to FIGS. 24 and 25. In particular considerations are important with the remote data facility operations in an asynchronous mode. In a preferred embodiment the remote data facility, which allows replication from a local to a target data storage system in an EMC Symmetrix Remote Data Facility-Asynchronous (SRDF-A).

Some concepts including how data consistency is achieved and data flow for the asynchronous mode are described for the sake of better comprehension of this invention. Below is a description of performance considerations and important parameters such as peak time, link bandwidth, locality of reference and cache, all of which impact the performance of the preferred SRDF-A.

When SRDF was introduced by EMC to the disaster recovery market in the mid 1990s, it offered three modes of operation:

1. Synchronous mode, which acknowledges an I/O as complete when it is written to both the local and remote cache of a Symmetrix SRDF pair;
2. Semi-synchronous mode, which allows one I/O out of synchronization per volume as a way to improve response time in certain cases; and.
3. Adaptive Copy (Disk and Write Pending [WP]) modes, which is a data movement solution that sends data to the remote side, however, does not guarantee any order.

Currently, many SRDF customers use Synchronous mode to protect data on a primary storage system. Synchronous mode creates a consistent copy of data on the secondary storage system (R2) but carries a price, both in performance (response time on the R1 side host), and cost (high-capacity links). The main premise of SRDF Asynchronous mode is to provide a consistent point-in-time image on the R2 side, which is not too far behind the R1 side, and which results in minimal data loss in the event of a disaster at the primary site.

For EMC customers that choose this level of protection, SRDF Asynchronous mode will provide:

A consistent point-in-time image on the secondary devices at all times.

Support for existing SRDF topologies (ESCON, Farpoint, point-to-point and switched fabric Fibre Channel, GigE)

No additional external hardware requirements

Ability to work at any distance without adding response time to the R1 side host Support for any Mainframe or Open System host, and any data type that Symmetrix recognizes (FBA, CKD, AS400, etc.)

Low impact on back-end (DA) directors

High performance (response time equivalent to writing to non-SRDF devices)

Figure 24:
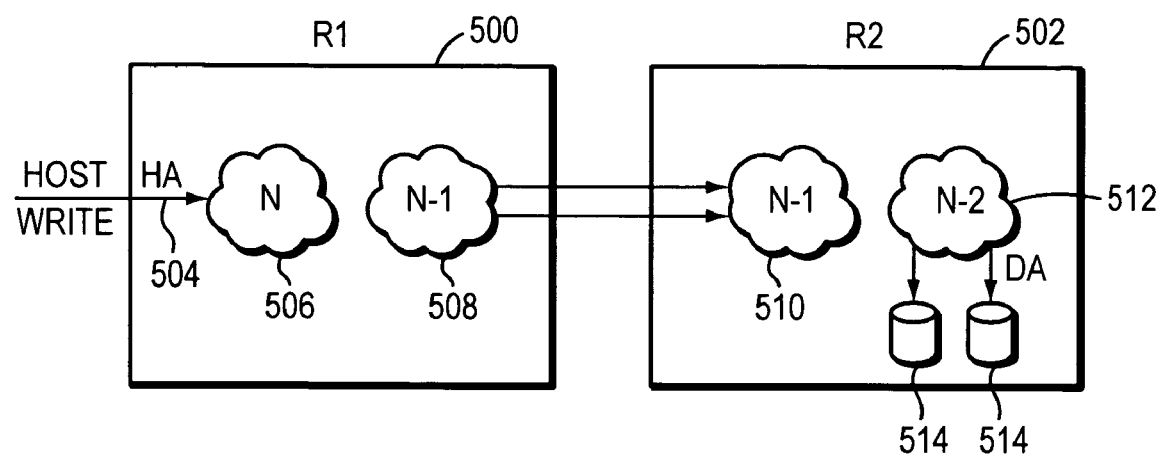
FIG. 24 shows calculated entities involved with using the software tool of FIG. 23.

The ability to read data from the R2 side to the R1 side (in the event all local mirrors fail on the R1 side), or to read the R2 device from a host at the R2 side Referring to FIG. 24, a brief overview of the preferred remote data facility is given. and the section beneath the figure. Each representation of N (including N−x) in FIG. 24 represents a set of cache slot pointers. N is the active cycle number on the primary (R1) side of the SRDF connection. Users should consider the following;

The R2 device itself always represents a consistent image for time N−2.

The R2 side is working on building a consistent image (for time N−1) by receiving data from the primary side.

The R1 side is sending cycle N−1 to the R2 side.

The R1 side is marking all new writes as belonging to time period N (host writes or internal copy writes)

From FIG. 24, it should be clear that SRDF Asynchronous mode does not actually order the host writes, such writes are depicted here as entity 504. Instead, it puts the host writes into cycles or chunks that are transferred one by one, i.e. cycle 506-512 to storage units 514. Only when the R2 side receives a complete chunk the operation can be committed. In FIG. 24, if the links are lost, partial chunk N−1 can be discarded, resulting in a consistent R2. Moreover, regular SRDF operation can be used for failback or failover without a full resynchronization.

Figure 25:
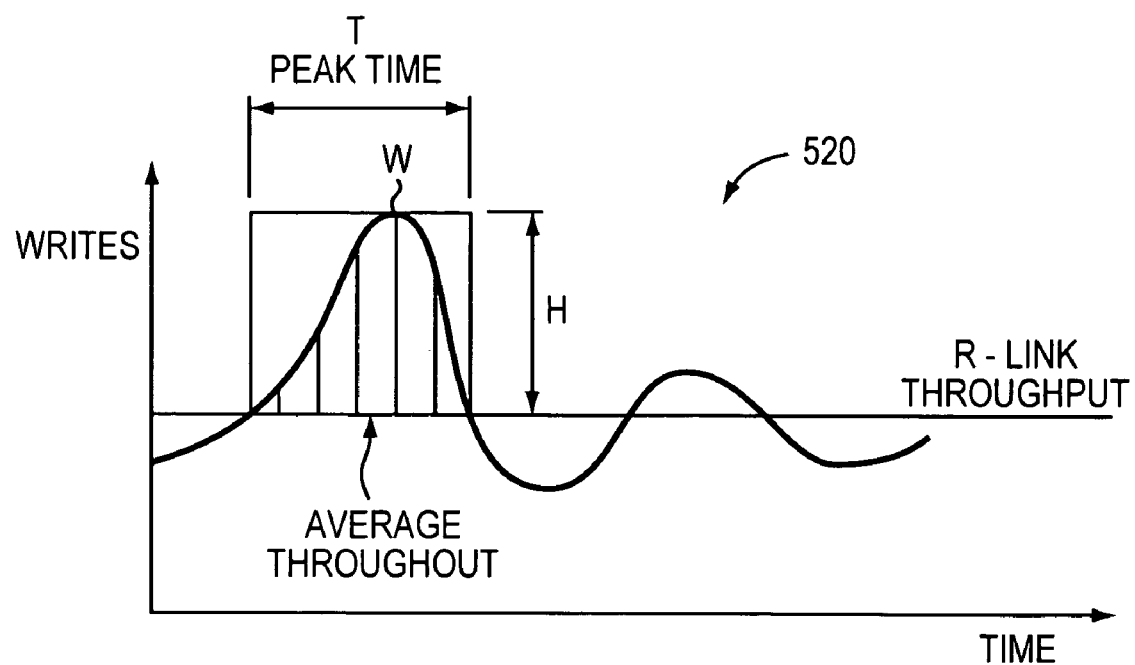
FIG. 25 shows performance and capacity planning considerations operated upon by the software tool of FIG. 23.

Referring to FIG. 25, The following parameters list the basic performance parameters that control the capacity planning for an SRDF-A implementation:

Peak Time

Link bandwidth

Locality of reference

Amount of cache

The following sections discuss these parameters and their impact on the performance aspects of SRDF-A.

FIG. 25 depicts a typical write workload in the preferred embodiment in which operation of tool 450 is useful. It is good for the link bandwidth to be at least as large as the average write workload. Assume the write peak is constant at rate W, with a height of H above the throughput link bandwidth (R) that lasts for T seconds. The inventors have recognized that peak time may be used to evaluate the busiest period during a workload. For example, if the peak time is x minutes, the busiest x minutes in the workload to determine the average write peak. This average write peak will directly impact the link bandwidth, and the amount of cache required for buffering the writes. In the preferred embodiment, increasing the peak time will, in most cases, decrease the RDF link bandwidth requirement, and increase the amount of cache required.

In its very simplistic form the peak time represents the length of the peak write workload, as shown in FIG. 25. In such a case the peak time represents the time the peak write workload was higher than the RDF link bandwidth. It is important to understand that, regardless of the collection tool, when performance data is collected, the minimal interval of the collection will also determine the minimal peak time that can be taken into account. For example, if the data is collected at a 15-minute interval, the accuracy of the calculation cannot take into account less than that time interval, so the minimal peak time will be 15 minutes.

The parameters influence operation and output of the tool. For example, the inventors recognize and build into the tool provisions for accommodating that selecting a short peak time results in a relatively high link bandwidth, and low cache requirement. On the other hand, for the same workload, selecting a longer peak time results in a lower link bandwidth, but at the price of higher cache requirement. The tool may be used to explore the expected performance and needed capacity for a system given the workload and using the tool to explore varying the other parameters.

Figure 26:
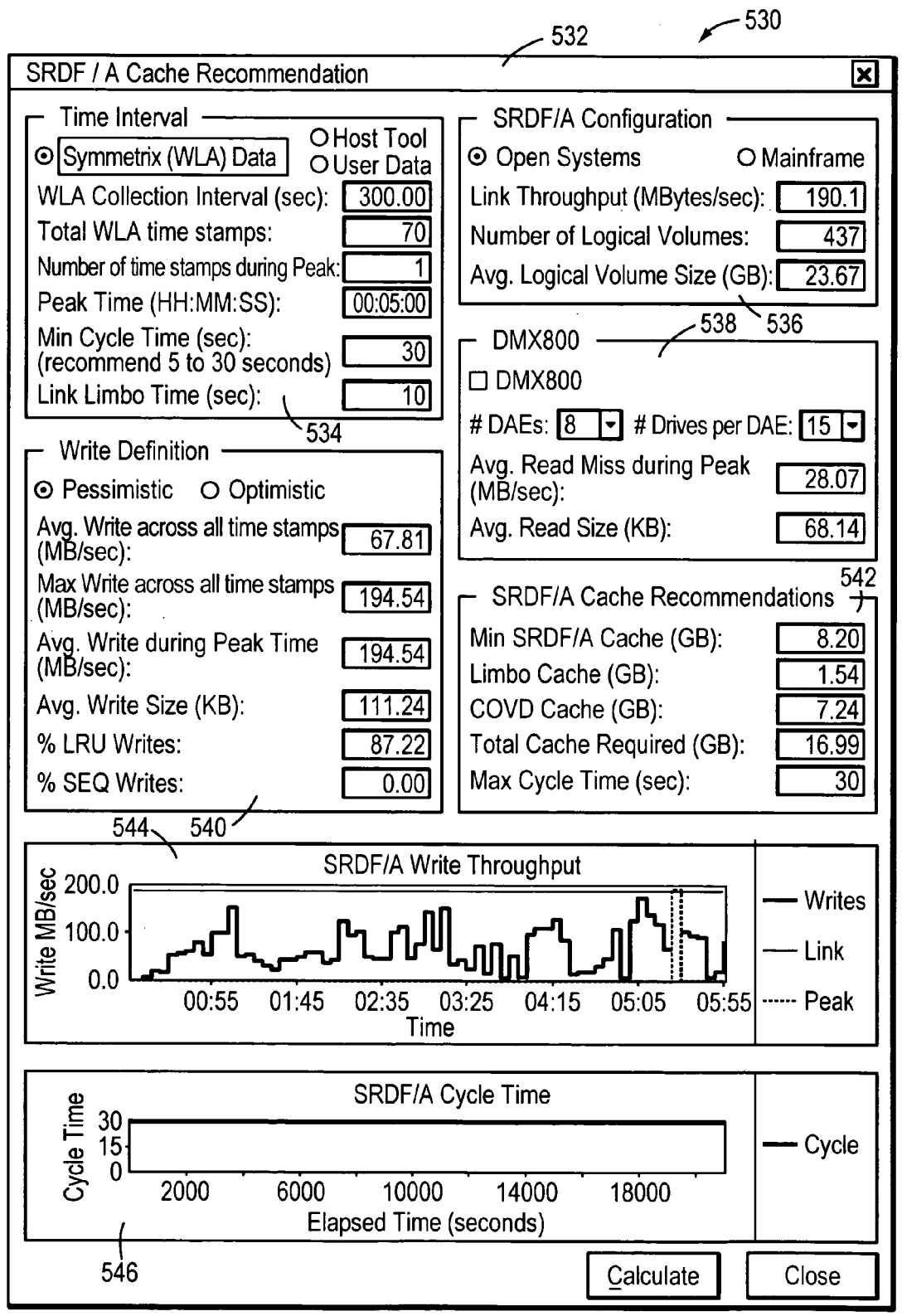
FIG. 26 shows a user interface screen showing a recommendation for performance and capacity planning for a remote data facility using the software tool of FIG. 23.

FIG. 26 shows an output display on user screen 530 titled for the user in field 532 as "SRDF/A Cache Recommendation." Field display areas 534-546, include, in respective ascending order, Time Interval, SRDF/A Configuration, DMX800, Write Definition, SRDF/A Cache Recommendations, SRDF Write Throughput, and SRDF/A Cycle Time. This information shown in FIG. 26 is based on calculations made by the tool 350. After reviewing the results, a user may enter new desired characteristics and then hit the Calculate button in the screen 530 display area to see results. Typically, a user may vary bandwidth since that is expensive and see what results follow. As expected, the amount of cache recommended will increase and the performance cycle time will increase unfavorably.

Referring again to FIG. 26, it is useful to review the various fields and certain recommendations. In field 536, the recommended bandwidth for the link between R1 (source) and R2 (target) is 190.1 MBytes/sec and this is based on input from 360 (FIG. 23) and determined by tool 350. The other data in this field is also determined using the input data (e.g., number of logical volumes and average logical volume size). In field 542, cache recommendations based on the bandwidth available are given. For example, the minimum amount of cache for SRDF/A is recommended as 8.20 GB, and the total cache is 16.99 GB, meanwhile the cycle time will be 30 seconds (which is configurable). This cycle time is basically how far behind the input of a host write it is sent as I/O to a target across the link and depends on bandwidth. It is a function of an asynchronous environment that there will always be a time behind before the I/O is transferred and part of the consideration of such an environment.

Referring to field 544 and 546 (FIG. 26) one can see that the cycle time shown on the cycle graph (field 546) is constant at 30 seconds, and the write throughput varies according to workload show in field 544. The peak (shown in dotted line) only once exceeds the link throughput. Because of locality of reference principles used by the preferred EMC Symmetrix software the small peak is easily managed.

Other fields shown in the preferred embodiment, 534, 538, and 540, are outputs of the tool and depend on input data. The time interval in 534 does not change as the user varies bandwidth. In 538, information is given about a particular data storage system based on its configuration and also does not change based on user variance. The write definition shows among other things the average write during peak time, which at 194.54 is the peak in dotted line shown in field 544. It does not change based on a user using the tool to vary bandwidth, but is rather based on input data.

Figure 27:
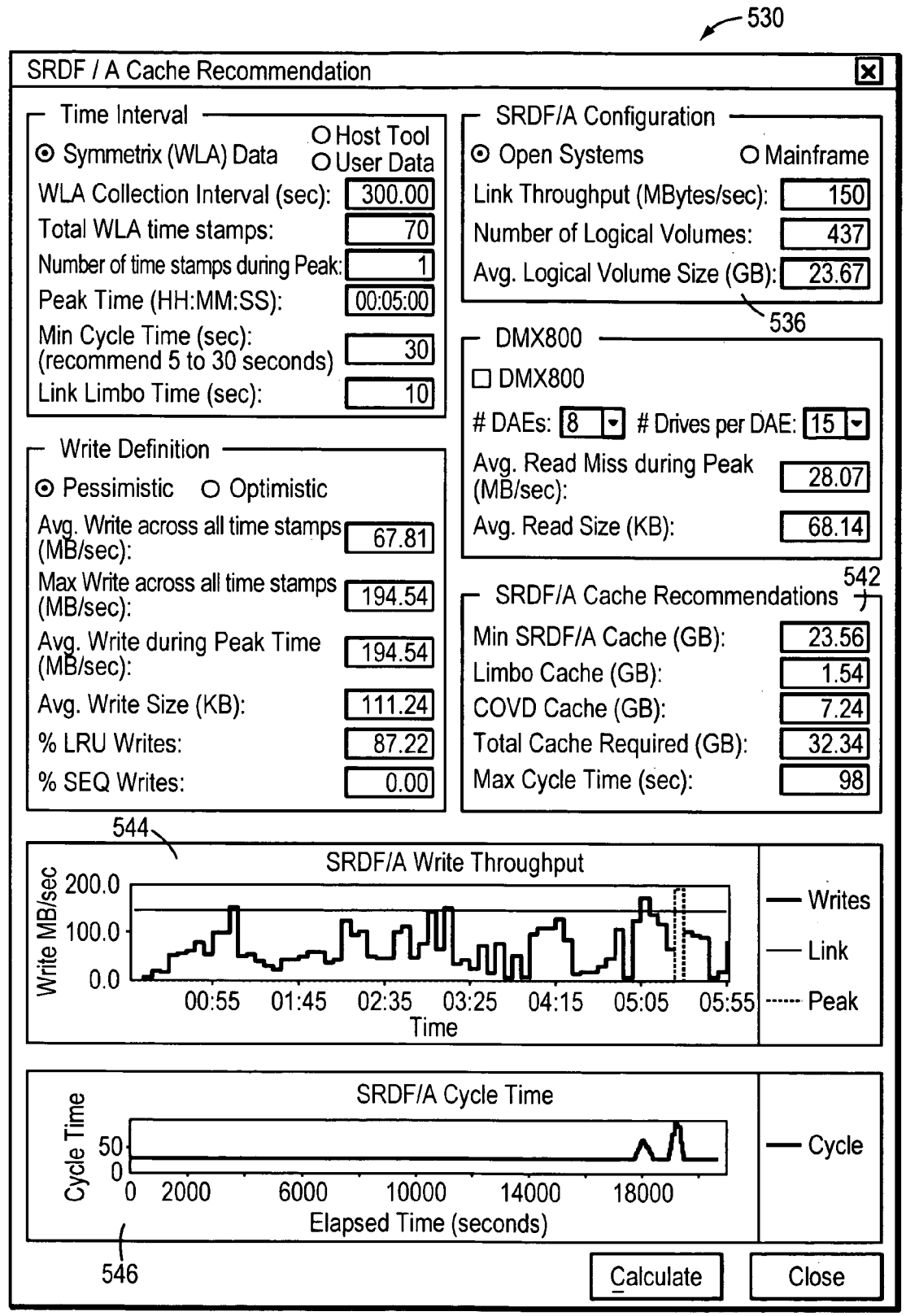
FIG. 27 shows another user interface screen showing a recommendation for performance and capacity planning for a remote data facility using the software tool of FIG. 23, based on user input in which the user may vary the recommendations shown in FIG. 26 to assess potential results.

FIG. 27 shows output display on user screen 530, wherein data has been varied in fields 536, 542, 544, and 546. In this example, in field 536, the user has changed the available bandwidth to 150 MBytes/sec to see the effect of such a change. Accordingly, in field 542, the amount of cache needed almost doubles to 32.34, and the maximum cycle time increases to 98 seconds. Accordingly, one can see in illustrative graphs shown in fields 544 and 546 that the write throughput is exceeded several times (not only during peak) and therefore much more cache is needed to buffer it. Since cache is generally much less expensive that bandwidth, this may be preferable to a user.

Figure 28:
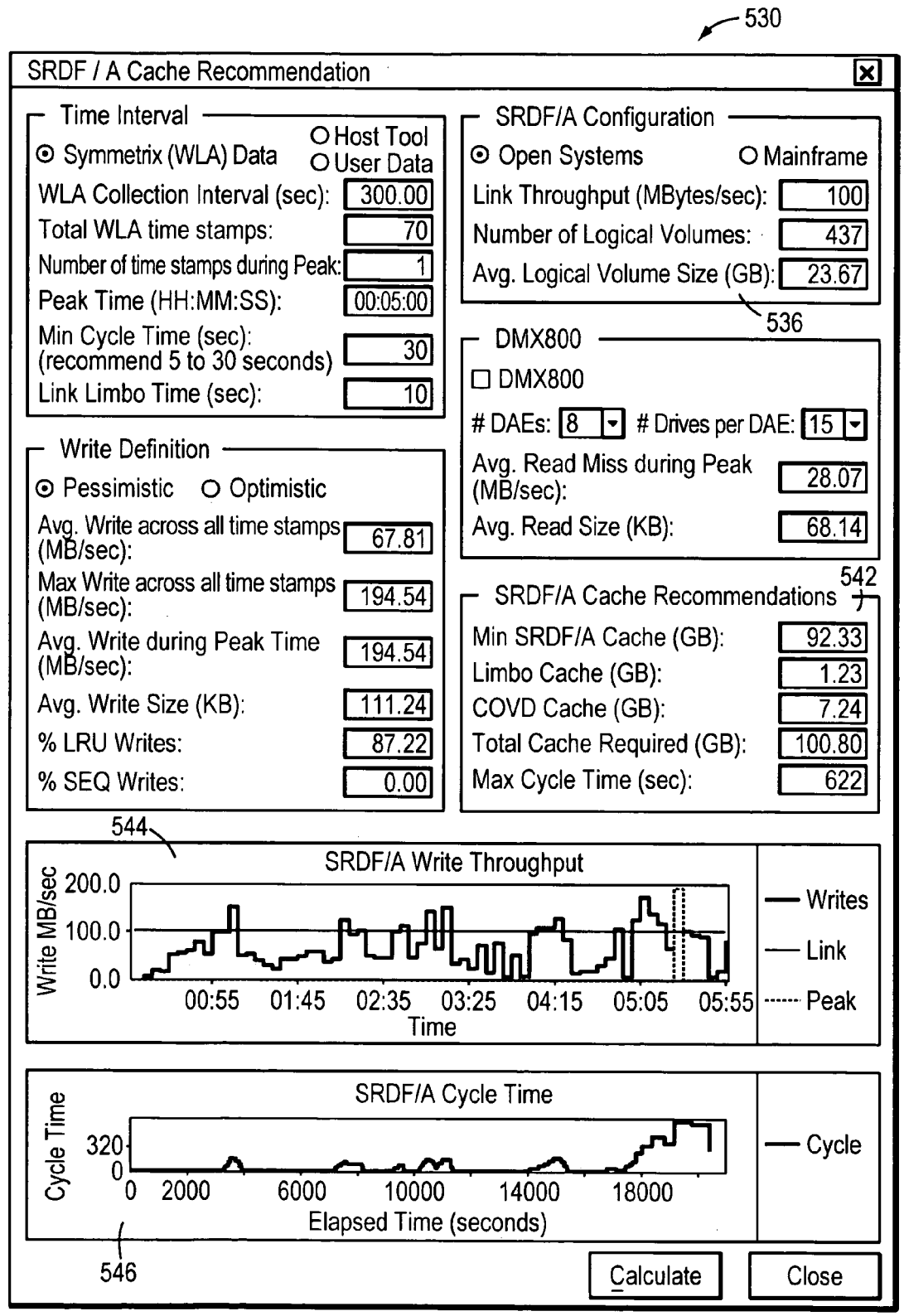
FIG. 28 shows another user interface screen showing a recommendation for performance and capacity planning for a remote data facility using the software tool of FIG. 23, based on user input in which the user may vary the recommendations shown in FIG. 26 to assess potential results.

FIG. 28 shows output display on user screen 530, wherein data has again been varied in fields 536, 542, 544, and 546. In this example In this example, in field 536, the user has changed the available bandwidth to 100 MBytes/sec to see the effect of such a change. Accordingly, in field 542, the amount of cache needed is 100.80 GB, and the maximum cycle time increases to 622 seconds (more than 10 minutes). Accordingly, one can see in illustrative graphs shown in fields 544 and 546 that the write throughput is exceeded several times (not only during peak) and therefore much more cache is needed to buffer it. Since cache is generally much less expensive that bandwidth, this may be acceptable to a user as long as the very long cycle time does not exceed the risk that the user is willing to take with the data. This will probably depend on the value of the data and how often it is updated.

Figure 29:
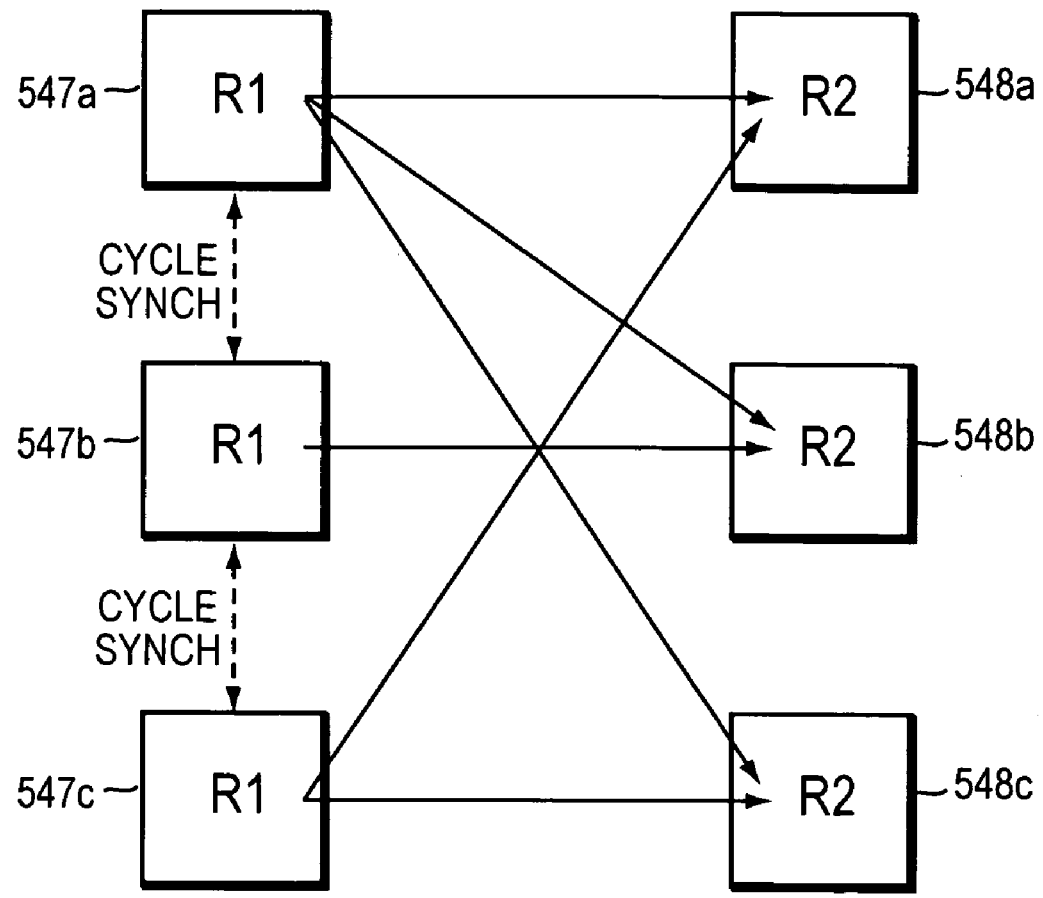
FIG. 29 shows a multi-box (multiple source and target data storage systems) for data replication comprising a data storage environment in which the software tool of FIG. 23 is useful.

FIG. 29 shows a multi-box replication environment wherein there are a plurality of data storage systems that are sources and another plurality that are targets, and wherein one source may have many targets. R1 sources 547a-c, each may have more than one R2 target 548a-c. For example, R1 547a source has target R2 548a, 548b, and 548c. Nevertheless, each R1 must be aligned or in synch with cycles with each other R1 and this must be compensated for by tool 350 for capacity planning, configuration, or performance simulation.

Figure 30:
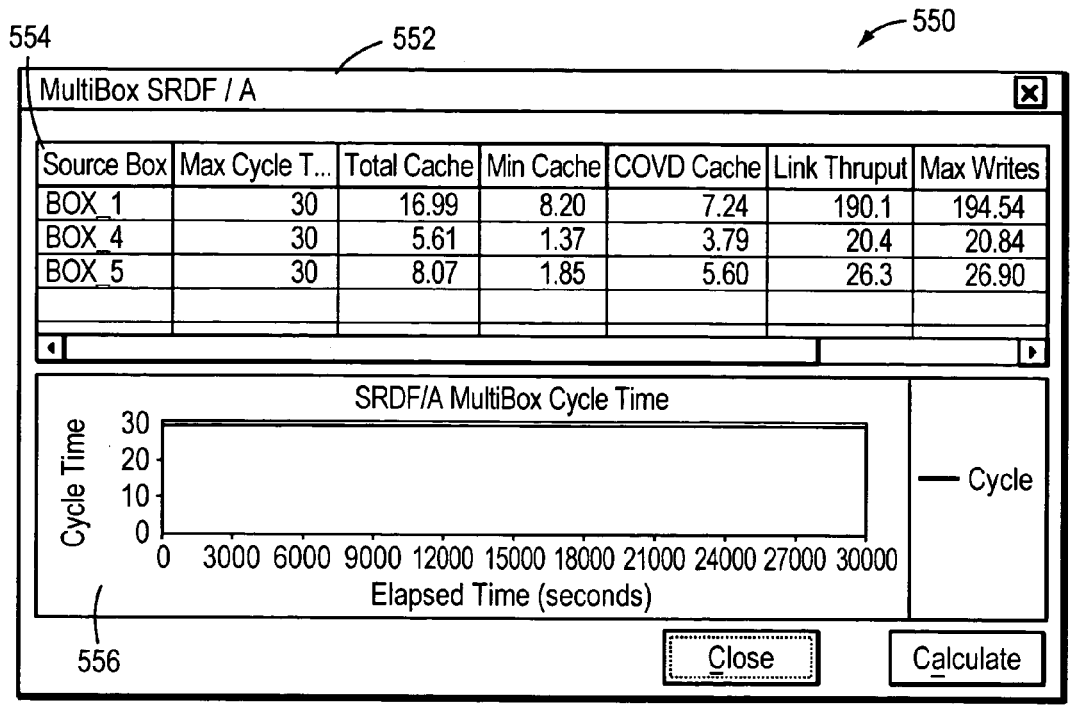
FIG. 30 shows another user interface screen showing a recommendation for capacity planning for the data storage environment depicted in FIG. 29.
Figure 31:
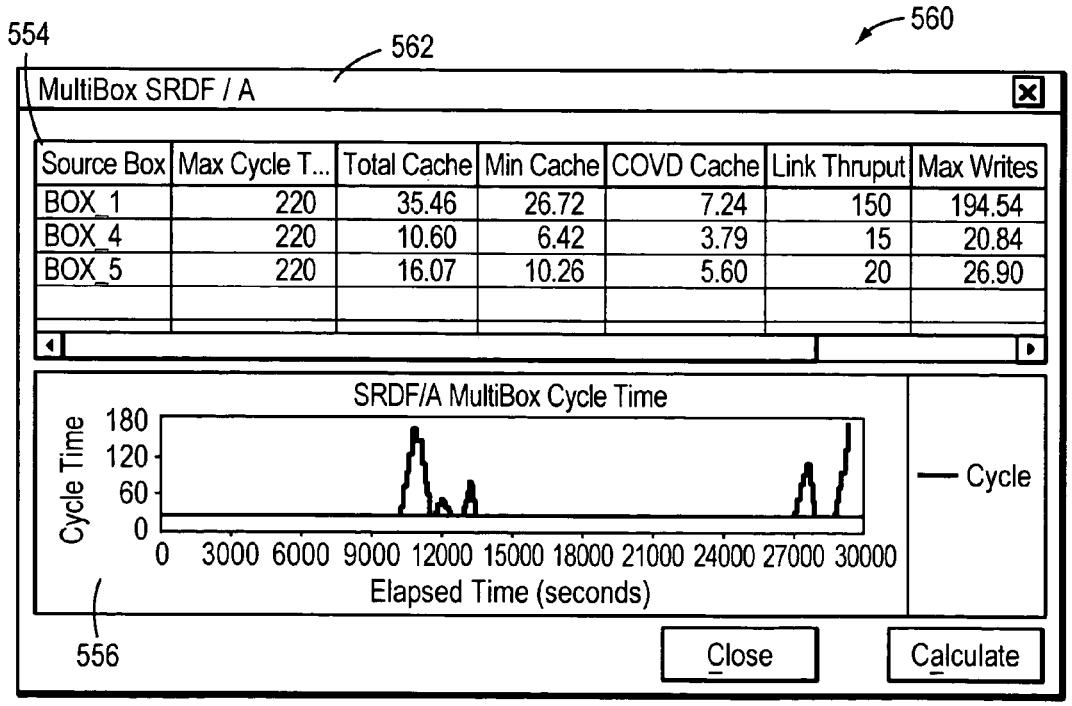
FIG. 31 shows another user interface screen showing another recommendation for capacity planning, based on user input in which the user may vary the recommendations shown in FIG. 30 to assess potential results.

FIGS. 30 and 31 show output display on user screen 550 entitled in field 552 "Multi-box SRDF/A." Included are display fields 554 and 556. Field 554 shows source box, max cycle time, total cache, minimum cache, cache only virtual devices (COVD), link throughput, and maximum writes. Field 556 shows SRDF/A Multi-box Cycle time.

FIG. 30 shows the output of the tool and is a recommendation based on the input 360. Box_1, Box_4, and Box_5 are different R1 sources. The recommended cache for Box 1 is the same as shown in FIG. 26 and so are the other parameters. In order to keep the recommended cycle time based on the link throughput and cache for Box_1, the other two boxes are accordingly profiled so that they can essentially keep up with the recommended cycle in terms of recommended cache and link throughput (for Box_4 and Box_5). Referring to FIG. 31, should the user vary the bandwidth to a lower number (for example 150 from 190.1 as shown) then the recommended cache and derived cycle time are shown for each box.

A system and method for simulating performance or determining capacity on one or more data storage systems and using such simulation information has been described. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A method, operable in a computer system, for recommending a bandwidth based, in part, on determined performance characteristics for a data storage system based on input related to the data storage system in a data storage environment in which a source data storage system replicates data to a target data system asynchronously, the method comprising the steps of:
   receiving utilization or response time data related to one or more source data storage systems, wherein said utilization or response time data is associated with utilization and calculations based on internal operations and processes inside said source data storage systems;
   receiving configuration information for the source data storage system;
   determining performance characteristics for the source data storage system; and
   determining a recommended link bandwidth between the source and target using the utilization or response time data and performance characteristics.

2. The method of claim 1, wherein the performance characteristics can be re-determined based on varying the recommended link bandwidth value and re-determining the performance characteristics.

3. The method of claim 1, wherein the performance characteristics are based on a recommended amount of cache for the source data storage system.

4. The method of claim 1, wherein the performance characteristics include a cycle time for asynchronous replication to the target data storage system.

5. The method of claim 2, wherein the re-determined performance characteristics are based on a recommended amount of cache for the source data storage system.

6. The method of claim 5, wherein the re-determined performance characteristics includes a cycle time for asynchronous replication to the target data storage system.

7. The method of claim 1, further comprising the step of:
   determining performance characteristics for the target data storage system using the utilization or response time data and performance characteristics.

8. A program product for recommending a bandwidth based on determined performance characteristics for a data storage system based on input related to the data storage system in a data storage environment in which a source data storage system replicates data to a target data system asynchronously, the program product including a computer readable medium with computer-executable program code configured for causing the following computer-executed steps to occur:
   receiving utilization or response time data related to one or more source data storage systems wherein said utilization or response time data is associated with utilization and calculations based on internal operations and processes inside said source data storage systems;
   receiving configuration information for the source data storage system;
   determining performance characteristics for the source data storage system; and
   determining a recommended link bandwidth between the source and target data storage systems using the utilization or response time data and performance characteristics.

9. The program product of claim 8, further comprising the step of:
   determining performance characteristics for the target data storage system using the utilization or response time data and performance characteristics.

10. A system for determining a bandwidth based on determined performance characteristics for a data storage system based on input related to the data storage system in a data storage environment, the system comprising:

at least one source data storage system;

at least one target replication data storage system, wherein the source data storage system replicates data to the target data system asynchronously a computer having a memory and a display;

computer-executable program code operating in memory, wherein the computer-executable program code is configured for execution of the steps of:

receiving utilization or response time data related to one or more source data storage systems, wherein said utilization or response time data is associated with utilization and calculations based on internal operations and processes inside said source data storage systems;

receiving configuration information for the source data storage system;

determining performance characteristics for the source data storage system; and determining a recommended link bandwidth between the source and target using the utilization or response time data and performance characteristics.

11. The system of claim 10, wherein the performance characteristics can be re-determined based on varying the recommended bandwidth value and re-determining the performance characteristics.

12. The system of claim 10, wherein the performance characteristics are based on a recommended amount of cache for the source data storage system.

13. The system of claim 10, wherein the performance characteristics include a cycle time for asynchronous replication to the target.

14. The system of claim 11, wherein the re-determined performance characteristics are based on a recommended amount of cache for the source data storage system.

15. The system of claim 14, wherein the re-determined performance characteristics includes a cycle time for asynchronous replication to the target.

16. The system of claim 10, further comprising the step of:

determining performance characteristics for the target data storage system using the utilization or response time data and performance characteristics.

17. An apparatus for recommending a bandwidth based, in part, on a determined performance characteristics for a data storage system based on input related to the data storage system in a data storage environment in which a source data storage system replicates data to a target data system asynchronously, the apparatus including means for causing the following steps to occur:

receiving utilization or response time data related to one or more source data storage systems, wherein said utilization or response time data is associated with utilization and calculations based on internal operations and processes inside said source data storage systems;

receiving configuration information for the source data storage system;

determining performance characteristics for the source data storage system; and determining a recommended link bandwidth between the source and target using the utilization or response time data and performance characteristics.

\* \* \* \* \*